United States Patent
Kim et al.

(10) Patent No.: US 10,488,978 B2
(45) Date of Patent: *Nov. 26, 2019

(54) DRIVING CHIP, CIRCUIT FILM, CHIP-ON-FILM TYPE DRIVING CIRCUIT, AND DISPLAY DEVICE HAVING BUILT-IN TOUCHSCREEN

(71) Applicant: LG Display Co., Ltd., Seoul (KR)

(72) Inventors: KiYong Kim, Goyang-si (KR); Youngwoo Jo, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/292,141

(22) Filed: Mar. 4, 2019

(65) Prior Publication Data

US 2019/0196650 A1 Jun. 27, 2019

Related U.S. Application Data

(63) Continuation of application No. 15/955,490, filed on Apr. 17, 2018, now Pat. No. 10,261,628, which is a (Continued)

(30) Foreign Application Priority Data

Aug. 31, 2016 (KR) .................... 10-2016-0112239
Dec. 20, 2016 (KR) .................... 10-2016-0174480

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/044* (2013.01); *G06F 3/0412* (2013.01);
(Continued)

(58) Field of Classification Search
CPC combination set(s) only.
See application file for complete search history.

(56) References Cited

U.S. PATENT DOCUMENTS

2010/0059295 A1* 3/2010 Hotelling .............. G06F 3/0416
178/18.06
2011/0193817 A1 8/2011 Byun et al.
(Continued)

FOREIGN PATENT DOCUMENTS

EP 2 960 759 12/2015

OTHER PUBLICATIONS

European Extended Search Report, European Application No. 16207098. 1, dated Jul. 18, 2017, 7 pages.
(Continued)

*Primary Examiner* — Insa Sadio
(74) *Attorney, Agent, or Firm* — Fenwick & West LLP

(57) ABSTRACT

A display device having a built-in touchscreen and a driving chip, a circuit film, and a chip-on-film (COF) type driving circuit included in the display device. The COF type driving circuit performs data driving and touch driving in a combined manner. A source driving circuit outputs image data voltages through data channels. At least one touch driving circuit outputs touch driving signals through touch channels. The source driving circuit and the at least one touch driving circuit are mounted on an integrated circuit film. Data channel lines electrically connected to the data channels and touch channel lines electrically connected to the touch channels are disposed on the integrated circuit film. The noise avoidance line disposed on the integrated circuit film is located outward of an at least one outermost touch channel line.

20 Claims, 31 Drawing Sheets

Related U.S. Application Data continuation of application No. 15/729,474, filed on Oct. 10, 2017, now Pat. No. 9,971,451, which is a continuation of application No. 15/391,705, filed on Dec. 27, 2016, now Pat. No. 9,817,512.

(51) Int. Cl.
*G06F 3/044* (2006.01)
*G02F 1/1333* (2006.01)

(52) U.S. Cl.
CPC ........ *G06F 3/0418* (2013.01); *G02F 1/13338* (2013.01); *G06F 2203/04107* (2013.01)

(56) References Cited

U.S. PATENT DOCUMENTS

| | | | |
|---|---|---|---|
| 2014/0042406 A1* | 2/2014 | Degner | H01L 27/326 257/40 |
| 2015/0002458 A1 | 1/2015 | Lee et al. | |
| 2015/0084912 A1 | 3/2015 | Seo et al. | |
| 2016/0188097 A1 | 6/2016 | Shin et al. | |

OTHER PUBLICATIONS

United States Office Action, U.S. Appl. No. 15/391,705, dated Mar. 24, 2017, 16 pages.

* cited by examiner

DCH: DATA CHANNEL
TCH: TOUCH CHANNEL

----- DATA CHANNEL LINE (DCL)
——— TOUCH CHANNEL LINE (TCL)

DRIVING CHIP, CIRCUIT FILM, CHIP-ON-FILM TYPE DRIVING CIRCUIT, AND DISPLAY DEVICE HAVING BUILT-IN TOUCHSCREEN

CROSS REFERENCE TO RELATED APPLICATIONS

This application is a continuation application of U.S. patent application Ser. No. 15/955,490 filed on Apr. 17, 2018, which is a continuation application of U.S. patent application Ser. No. 15/729,474 filed on Oct. 10, 2017, now U.S. Pat. No. 9,971,451 issued on May 15, 2018, which is a continuation application of U.S. patent application Ser. No. 15/391,705 filed on Dec. 27, 2016, now U.S. Pat. No. 9,817,512 issued on Nov. 14, 2017, which claims priority from Korean Patent Application Number 10-2016-0112239 filed on Aug. 31, 2016 and from Korean Patent Application Number 10-2016-0174480 filed on Dec. 20, 2016, all of which are incorporated by reference herein.

BACKGROUND

1. Field

Exemplary embodiments of the present disclosure relate to a display device having a built-in touchscreen and a driving chip, a circuit film, and a chip-on-film (COF) type driving circuit included in the display device.

2. Description of Related Art

In response to the development of the information society, demand for a variety of display devices for displaying images is increasing. In this regard, a range of display devices, such as liquid crystal display (LCD) devices, plasma display panels (PDPs), and organic light-emitting display devices, have recently been used.

Many display devices provide touch-based input interfaces enabling users to intuitively and conveniently input data or instructions directly to devices, rather than using conventional input systems, such as buttons, a keyboard, or a mouse.

To provide such touch-based input interfaces, the ability to sense a touch made by a user and accurately detect touch coordinates is required.

In this regard, in the related art, a touch sensing method selected from among a variety of methods of touch sensing, such as resistive touch sensing, capacitive touch sensing, electromagnetic induction, infrared (IR) touch sensing, and ultrasonic touch sensing, is used to enable touch sensing.

In such a variety of touch sensing methods, capacitive touch sensing is commonly used, in which a touch electrodes are disposed on a touchscreen panel (TSP) to detect a touch and touch coordinates based on changes in capacitance between specific touch electrodes or changes in the capacitance between specific touch electrodes and a pointer, such as a finger.

A range of attempts at disposing a touchscreen panel including electrodes in a display panel have been made in order to facilitate the fabrication of display devices and reduce the sizes of display devices.

However, a display device having a built-in touchscreen must be provided with a source driving circuit driving data lines to display images and a touch driving circuit driving touch electrodes to enable touch sensing, in which the source driving circuit and the touch driving circuit are separately provided.

This may increase the number of components of driving circuits required. In particular, the number of components of driving circuits may be increased further when the size or resolution of a display panel increases.

Therefore, in the development of a display device having a built-in touchscreen, the number of components of driving circuits may be significantly reduced by integrating a source driving circuit with a touch driving circuit.

A source driving circuit is typically embodied as a chip-on-film (COF) type circuit to be connected to a display panel. When the COF type source driving circuit is integrated with a touch driving circuit, touch sensing errors may occur. Such errors do not commonly occur when the touch driving circuit and the source driving circuit are provided separately, and the cause thereof has not yet been identified.

BRIEF SUMMARY

Various aspects of the present disclosure provide a driving chip, a circuit film, a chip-on-film (COF) type driving circuit, and a display device having a built-in touchscreen, able to remove or reduce noise that would otherwise cause touch sensing errors when a COF type touch driving circuit is embodied.

Also provided are a circuit film having a line structure able to prevent noise that would otherwise cause touch sensing errors, a driving chip mounted thereon, a COF type driving circuit, and a display device having a built-in touchscreen.

In one embodiment, a chip-on-film type driving circuit for performing data driving and touch driving in a touch enabled display panel is provided. The chip-on-film type driving circuit is connected to the touch enabled display panel and comprises a source driving circuit to output image data voltages through a plurality of data channels in a display mode, at least one touch driving circuit to output touch driving signals through a plurality of touch channels in a touch mode, and an integrated circuit film on which the source driving circuit and the at least one touch driving circuit are mounted, a plurality of data channel lines each electrically connected to a corresponding one of the data channels of the source driving circuit, a plurality of touch channel lines each electrically connected to a corresponding one of the touch channels of the touch driving circuit to carry a touch drive signal during the touch mode, the touch channel lines including at least an outermost touch channel line having another touch channel line adjacent to one side of the outermost touch channel line but having no other touch signal line adjacent to another side of the outermost touch channel line, and at least a noise avoidance line adjacent to said another side of the outermost touch channel line, a touch sense signal not being sensed from the noise avoidance line in the touch mode and the noise avoidance line not carrying the image data voltages in the display mode. In one embodiment, the touch channel lines are electrically connected to a display panel, and the noise avoidance line is not electrically connected to the display panel.

In one embodiment, a noise avoidance signal corresponding to the touch driving signal is applied to the noise avoidance line in response to the touch driving signal being applied to the outermost touch channel line, the noise avoidance signal being identical to, or in phase with, the touch driving signal. In another embodiment, a noise avoidance signal corresponding to the touch driving signal is applied to the noise avoidance line in response to the touch driving signal being applied to the outermost touch channel line, an amplitude of the noise avoidance signal being identical to an amplitude of the touch driving signal. In still another embodiment, a noise avoidance signal corresponding to the touch driving signal is applied to the noise avoidance line in response to the touch driving signal being applied to the outermost touch channel line, an amplitude of the noise avoidance signal being greater than an amplitude of the touch driving signal.

In another embodiment, he COF type driving circuit may include: a source driving circuit outputting image data voltages through data channels; at least one touch driving circuit outputting touch driving signals through touch channels; and an integrated circuit film on which the source driving circuit and the at least one touch driving circuit are mounted.

Data channel lines, touch channel lines, and a noise avoidance line may be disposed on the integrated circuit film. The data channel lines on the integrated circuit film may be electrically connected to the data channels of the source driving circuit. The touch channel lines on the integrated circuit film may be electrically connected to the touch channels of the touch driving circuit.

The noise avoidance line may be located outward of an at least one outermost touch channel line among the touch channel lines.

According to another aspect of the present disclosure, provided is a driving chip for performing data driving and touch driving in a combined manner.

The driving chip may include: data channels; touch channels; a source driving circuit outputting image data voltages through the data channels; and at least one touch driving circuit outputting touch driving signals through the touch channels.

The driving chip may further include a noise avoidance channel electrically connected to at least one touch channel among the touch channels.

A noise avoidance signal may be output through the noise avoidance channel, the noise avoidance signal being identical to or in phase with the touch driving signals.

According to another aspect of the present disclosure, a display device having a built-in touchscreen may include: a display panel on which a data lines and touch electrodes are disposed; and a driving circuit driving the data lines and the touch electrodes.

The driving circuit may include: source driving circuit outputting image data voltages through a number of data channels corresponding to the data lines; at least one touch driving circuit outputting touch driving signals through touch channels corresponding to the touch electrodes; and an integrated circuit film on which the source driving circuit and the at least one touch driving circuit are mounted.

Data channel lines and touch channel lines may be disposed on the integrated circuit film, the data channel lines being electrically connected to the data channels of the source driving circuit, the touch channel lines being electrically connected to the touch channels of the touch driving circuit.

In addition, a noise avoidance line may be disposed on the integrated circuit film. The noise avoidance line may be located outward of an at least one outermost touch channel line among the touch channel lines.

According to another aspect of the present disclosure, a COF type driving circuit may include: at least one touch driving circuit outputting touch driving signals through touch channel lines; and a circuit film on which the at least one touch driving circuit is mounted.

Touch channel lines may be disposed on the circuit film. The number of touch channel electrically connected to the touch channels of the touch driving circuit.

A noise avoidance line may be disposed on the circuit film. The noise avoidance line may be located outward of an at least one outermost touch channel line among the touch channel lines.

According to still another aspect of the present disclosure, provided is a circuit film on which a driving circuit is mounted.

The circuit film may include: touch channel lines to which touch driving signals are applied; and a noise avoidance line disposed outward of an at least one outermost touch channel line among the touch channel lines.

In one or more embodiments, A chip-on-film type driving circuit for performing data driving and touch driving in a combined manner, comprising: a source driving circuit comprising a number of data channels and configured to output image data voltages through the number of data channels; at least one touch driving circuit comprising a number of touch channels and at least one noise avoidance channel and configured to output touch driving signals through the number of touch channels and output a noise avoidance signal through the at least one noise avoidance channel; and an integrated circuit film on which the source driving circuit and the at least one touch driving circuit are mounted, a number of touch channel lines disposed on the integrated circuit film and electrically connected to respective ones of the touch channels of the at least one touch driving circuit, at least one noise avoidance line disposed on the integrated circuit film and electrically connected to the at least one noise avoidance channel of the at least one touch driving circuit, wherein the at least one noise avoidance line is located outward of at least one outermost touch channel line among the number of touch channel lines, and wherein the at least one noise avoidance channel line is not configured to be connected to any of data lines connected to pixels of a display panel and signal lines connected to touch electrodes on the display panel.

In one or more embodiments, The chip-on-film type driving circuit further comprising: a number of data channel lines, wherein the data channel lines are electrically connected to respective ones of the data channels of the source driving circuit, wherein the touch channel lines are electrically connected to respective ones of the touch channels of the at least one touch driving circuit, wherein the at least one noise avoidance line is located outward of at least one outermost touch channel line among the number of touch channel lines, and wherein the at least one touch driving circuit comprises at least one noise avoidance channel electrically connected to the at least one noise avoidance line.

In one or more embodiments, the at least one touch driving circuit is configured to output a noise avoidance signal through the at least one noise avoidance channel, wherein the noise avoidance signal is identical to or in phase with the touch driving signals.

In one or more embodiments, the at least one noise avoidance channel is electrically connected to at least one touch channel among the number of touch channels.

In one or more embodiments, the at least one noise avoidance channel is electrically connected to at least one outermost touch channel among the number of touch channels corresponding to the at least one outermost touch channel line among the number of touch channel lines.

In one or more embodiments, the data channel lines are configured to be connected to respective data lines leading to respective pixels of the display panel and output the image data voltages to the pixels, wherein the touch channel lines are configured to be connected to respective signal lines leading to respective touch electrodes on the display panel and output the touch driving signals to the touch electrodes.

In one or more embodiments, the at least one outermost touch channel line comprises a first outermost touch channel line located distant from the source driving circuit and a second outermost touch channel line located proximate the source driving circuit.

In one or more embodiments, a length of the first outermost touch channel line is greater than a length of the second outermost channel line.

In one or more embodiments, the at least one noise avoidance line comprises a first noise avoidance line located outward of the first outermost touch channel line and a second noise avoidance line located outward of the second outermost touch channel line.

In one or more embodiments, the at least one noise avoidance line comprises at least one additional noise avoidance line located outward of the first outermost touch channel line.

In one or more embodiments, the at least one noise avoidance line comprises a noise avoidance line outward of the first outermost touch channel line but no noise avoidance line outward of the second outermost touch channel line.

In one or more embodiments, the source driving circuit is configured to output a load-free driving signal to a data channel line located adjacent to the second outermost touch channel line during a touch mode period, the load-free driving signal being identical to or in phase with the touch driving signals.

In one or more embodiments, the number of touch channel lines comprises a first group of touch channel lines connected to a first side of the at least one touch driving circuit and a second group of touch channel lines connected to a second side of the at least one touch driving circuit that is opposite the first side.

In one or more embodiments, the at least one noise avoidance line comprises a noise avoidance line disposed between a touch channel line among the touch channel lines of the first group, closest to the second group, and a touch channel line among the touch channel lines of the second group, closest to the first group.

In one or more embodiments, a display device having a built-in touchscreen, the display device comprising: a display panel on which a number of data lines and a number of touch electrodes are disposed; and a chip-on-film type driving circuit, wherein the data channels of the source driving circuit of the chip-on-film type driving circuit are electrically connected to respective ones of the data lines, and wherein the touch channels of the at least one touch driving circuit of the chip-on-film type driving circuit are electrically connected to respective ones of the touch electrodes.

A noise avoidance line may be disposed on the circuit film. The noise avoidance line may be located outward of an at least one outermost touch channel line among the number of touch channel lines. The noise avoidance line may not be connected (or may not be configured to be connected) to any of the touch electrodes. In other words, a noise avoidance line may be a signal line that is not configured to provide a signal to a touch electrode and/or receive a signal from a touch electrode. Furthermore, the noise avoidance line may not be connected (or may not be configured to be connected) to any of the data lines. In other words, the noise avoidance line may be a signal line that is not configured to provide a signal to a data line. For example, the noise avoidance line may not be connected (or may not be configured to be connected) to the display panel. For example, in one or more embodiments the noise avoidance line may not have a contact pad or pad area configured to be connected to a data line or signal line, or generally to any conductive line of the display panel. In one or more embodiments, the noise avoidance line may be connected to a dummy signal line of the display panel. A "dummy signal line" may, for example, include or be a line that carries a similar or the same signal as a "true" signal line (e.g., data line or touch signal line) but may not be required to operate the image display or touch sensing functionality, but may, for example, be used to achieve that a signal line (e.g., data line or touch signal line) that has a neighboring signal line (e.g., data line or touch signal line) at only one side feels a similar or same environment as a signal line (e.g., data line or touch signal line) that a neighboring signal line (e.g., data lines or touch signal lines) at both sides, i.e. at two opposite sides, e.g. left and right side. For example, a dummy signal line may be a signal line that is used to provide a load-free driving signal.

According to the exemplary embodiments, when a driving circuit is embodied as a COF type, there is an effect of providing a driving chip STIC capable of removing or reducing noise that would otherwise cause touch sensing errors, a circuit film ICF, a COF type driving circuit IDC, and a display device 100 having a built-in touchscreen.

According to the exemplary embodiments, there is an effect of providing an IC film ICF having a line structure able to prevent noise that would otherwise cause touch sensing errors, a driving chip STIC mounted thereon, a COF type driving circuit IDC, and a display device 100 having a built-in touchscreen.

BRIEF DESCRIPTION OF THE DRAWINGS

The above and other objects, features and advantages of the present disclosure will be more clearly understood from the following detailed description when taken in conjunction with the accompanying drawings.

DETAILED DESCRIPTION

Figure 1:
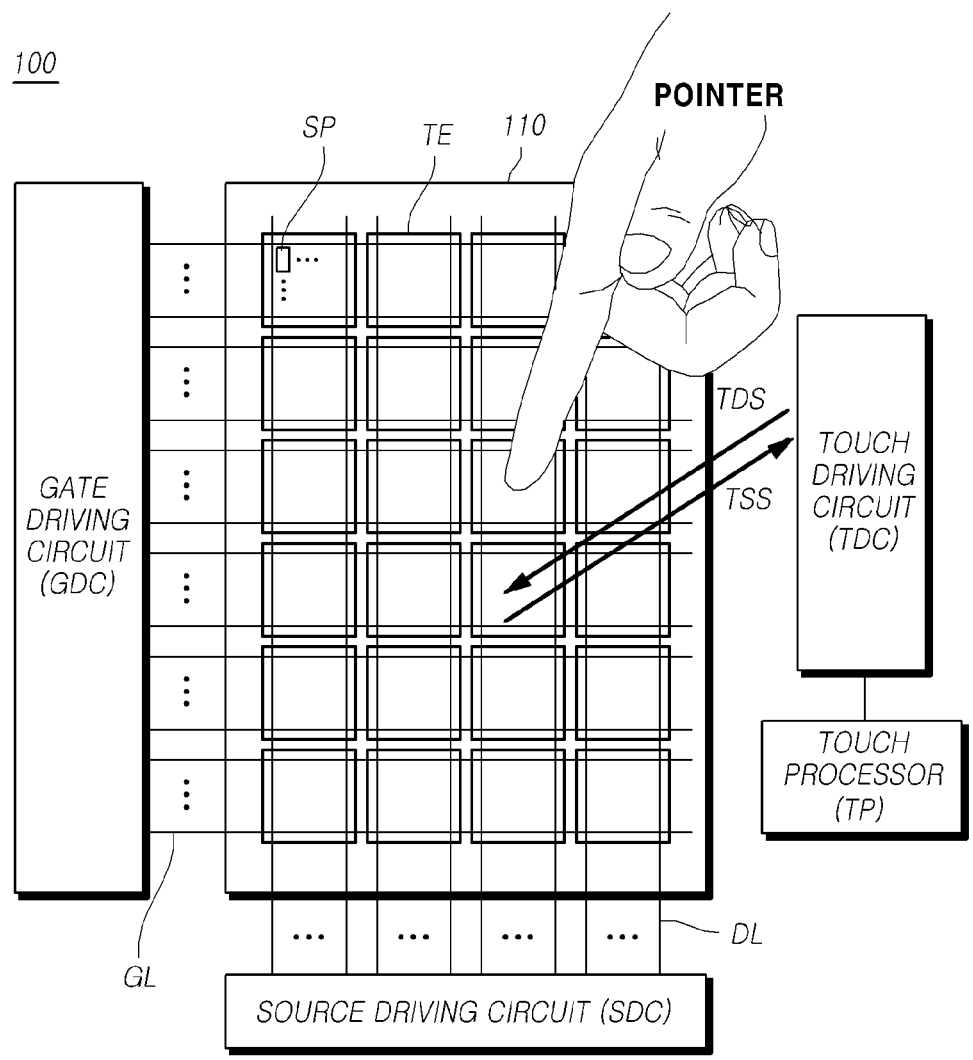
FIG. 1 is a schematic view illustrating a display device having a built-in touchscreen according to exemplary embodiments.

Hereinafter, reference will be made to embodiments of the present disclosure in detail, examples of which are illustrated in the accompanying drawings. Throughout this document, reference should be made to the drawings, in which the same reference numerals and signs will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a schematic view illustrating a display device 100 having a built-in touchscreen according to exemplary embodiments.

Referring to FIG. 1, the display device 100 having a built-in touchscreen according to exemplary embodiments includes a display panel 110 within which a touchscreen panel (TSP) is disposed, a variety of circuits, and so on.

The display device 100 having a built-in touchscreen according to exemplary embodiments can perform a display function to display images and a touch function to sense a touch made using a pointer, such as a finger or a pen.

Thus, the display device 100 having a built-in touchscreen according to exemplary embodiments can operate in a display mode to perform the display function during a display mode period or in a touch mode to perform the touch function during a touch mode period.

The display mode period and the touch mode period may be divided on a temporal basis, may be simultaneous within the same period of time, or may overlap on a temporal basis.

That is, the display mode operation for displaying images and the touch mode operation for performing touch sensing can be performed separately or simultaneously.

In the display panel 110 according to exemplary embodiments, data lines DL for displaying images and gate lines GL are provided, and subpixels SP defined by the data lines DL and the gate lines GL are provided.

The display panel 110 according to exemplary embodiments can also act as a touchscreen panel (TSP).

Thus, touch electrodes TE acting as touch sensors for touch sensing are arranged on the display panel 110 according to exemplary embodiments.

In this sense, the display panel 110 according to exemplary embodiments is described as having a touchscreen panel (TSP) disposed therewithin, and is referred to as a "display panel having a built-in touchscreen."

Such a display device including the display panel 110 having a built-in touchscreen will be referred to as a display device having a built-in touchscreen.

Referring to FIG. 1, the display device 100 having a built-in touchscreen includes a source driving circuit SDC and a gate driving circuit GDC to drive the display panel 110 during the display mode period. The source driving circuit SDC drives the data lines DL, while the gate driving circuit GDC drives the gate lines GL.

In addition, the display device 100 having a built-in touchscreen may further include at least one controller to control the operation timing of the source driving circuit SDC and the gate driving circuit GDC or the supply of power to the source driving circuit SDC and the gate driving circuit GDC.

Referring to FIG. 1, the display device 100 having a built-in touchscreen includes a touch driving circuit TDC, a touch processor TP, and so on, to drive the display panel 110 during the touch driving mode. The touch driving circuit TDC drives the touch electrodes TE, while the touch processor TP determines the occurrence of a touch and/or a touched position based on signals received from the touch electrodes TE to which touch driving signals TDS are applied during the touch mode period.

The touch driving circuit TDC can supply the touch driving signals TDS to the touch electrodes TE to drive the touch electrodes TE.

In addition, the touch driving circuit TDC can receive touch sensing signals TSS from the touch electrodes TE to which the touch driving signals TDS are supplied.

The touch driving circuit TDC supplies the received touch sensing signals TSS or sensing data obtained by processing the received touch sensing signals TSS to the touch processor TP.

The touch processor TP can execute a touch algorithm using the touch sensing signals TSS or the sensing data and determine the occurrence of a touch and/or the touched position.

As described above, the display device 100 having a built-in touchscreen according to exemplary embodiments may use self-capacitance based touch sensing that determines the occurrence of a touch and/or the touched position by detecting a change in the self-capacitance between each of the touch electrodes TE and the pointer.

Thus, in the display device 100 having a built-in touchscreen according to exemplary embodiments, the touch driving signals TDS are applied to the touch electrodes TE and the touch sensing signals TSS are detected from the touch electrodes TE.

The display device 100 having a built-in touchscreen according to exemplary embodiments may use mutual-capacitance based touch sensing, in which the touch electrodes TE are divided into driving electrodes (also referred to as touch driving electrodes or Tx electrodes) and sensing electrodes (also referred to as touch sensing electrodes or Rx electrodes). The mutual-capacitance based touch sensing determines the occurrence of a touch and/or a touched position based on changes in mutual capacitance between the driving electrodes and the sensing electrodes by applying touch driving signals TDS to the driving electrodes and receiving touch sensing signals TSS using the sensing electrodes.

However, hereinafter, a case in which the self-capacitance based touch sensing is used will be described for the sake of brevity.

In the self-capacitance based touch sensing, the display device 100 having a built-in touchscreen according to exemplary embodiments does not require touch driving electrodes (i.e. driving electrodes or Tx electrodes) to which touch driving signals TDS are applied separate from touch sensing electrodes (i.e. sensing electrodes or Rx electrodes) for detecting touch sensing signals TSS, whereby panel processing may be facilitated. Rather, in self-capacitive touch sensing, the touch driving signals TDS are supplied to the touch electrodes TE and the touch sensing signals TSS are received from the same touch electrodes TE to which the touch driving signals TDS are supplied. In other words, in the self-capacitance based touch sensing the touch electrodes TE may not need to be divided into two different types of touch electrodes, i.e. touch driving electrodes and touch sensing electrodes.

The source driving circuit SDC, the gate driving circuit GDC, the touch driving circuit TDC, and the touch processor TP as described above are categorized according to function. In some cases, two or more of the source driving circuit SDC, the gate driving circuit GDC, the touch driving circuit TDC, and the touch processor TP may be integrated with each other.

According to exemplary embodiments, the size of a single touch electrode TE may be greater than the size of a single subpixel SP. That is, the size of a single touch electrode TE may be equal to or greater than the size of a plurality of subpixels SP.

For example, the size of a single touch electrode TE (i.e. a unit touch electrode) may be several to several hundred times the size of a single subpixel SP.

The ratio of the size of a touch electrode and the size of a subpixel may be adjusted comprehensively considering the efficiency and performance of touch sensing, an influence on the display by touch sensing, or the like.

According to exemplary embodiments, a single touch electrode TE may be a single bulk electrode.

The single bulk electrode corresponding to the single touch electrode TE may be a leaf electrode without an open area or an electrode having an open area.

Alternatively, a single touch electrode TE may be comprised of a plurality of sub-electrodes arranged in the form of a mesh and electrically connected to each other.

In addition, a single touch electrode TE may be comprised of a plurality of sub-electrodes arranged linearly and electrically connected to each other.

As described above, the touch electrodes TE may be designed to have a variety of shapes and sizes. The touch electrodes TE illustrated in FIG. 1 may be interpreted as unit areas for touch driving and touch sensing.

Figure 2:
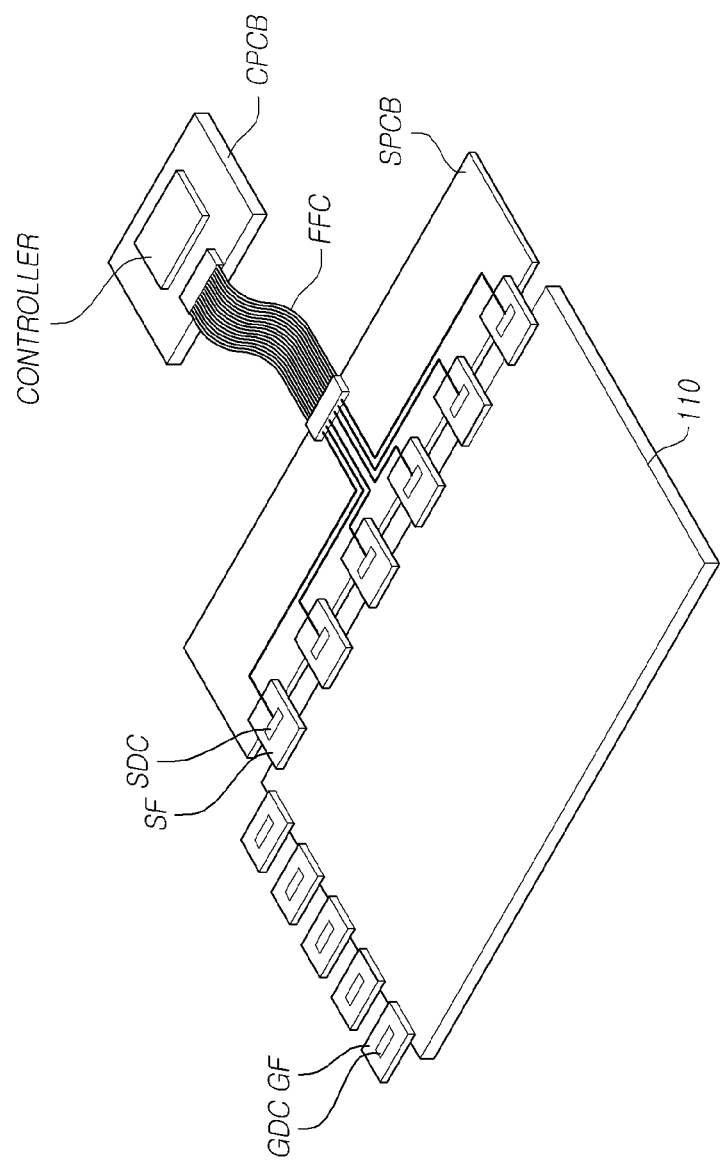
FIG. 2 is a perspective view illustrating an example of the display device having a built-in touchscreen according to exemplary embodiments.

FIG. 2 is a perspective view illustrating an example of the display device 100 having a built-in touchscreen according to exemplary embodiments.

Referring to FIG. 2, source driving circuits SDC may be embodied as chip-on-film (COF) type circuits.

In this case, the source driving circuits SDC may be embodied as chips mounted on source circuit films SF.

One end of each of the source circuit films SF is electrically connected (or bonded) to the display panel 110, while the other end (opposite end) of each of the source circuit films SF is electrically connected (or bonded) to a source printed circuit board SPCB.

The source printed circuit board SPCB is connected to a control printed circuit board CPCB via a connecting member, such as a flexible flat cable FFC.

The control printed circuit board CPCB has a controller CONTROLLER mounted thereon to control the source driving circuits SDC and gate driving circuits GDC. The gate driving circuits GDC may be embodied as chips mounted on gate circuit films GF. A power controller (not shown) for power management and control may be further mounted on the control printed circuit board CPCB.

Although FIG. 2 illustrates an example in which the source driving circuits SDC are embodied as COF type circuits, this example may be variously modified.

For example, two or more source printed circuit boards SPCB may be provided, the source printed circuit board SPCB and the control printed circuit board CPCB may be integrated into a single structure, one or more source driving circuits SDC may be provided, or the source driving circuits SDC may be integrated with the controller CONTROLLER.

Although the source driving circuits SDC may be disposed on one side of the display panel 110 as illustrated in FIG. 2, the source driving circuits SDC may be disposed on both sides (opposite sides) (e.g. the upper side and the lower side) of the display panel 110.

Figure 3:
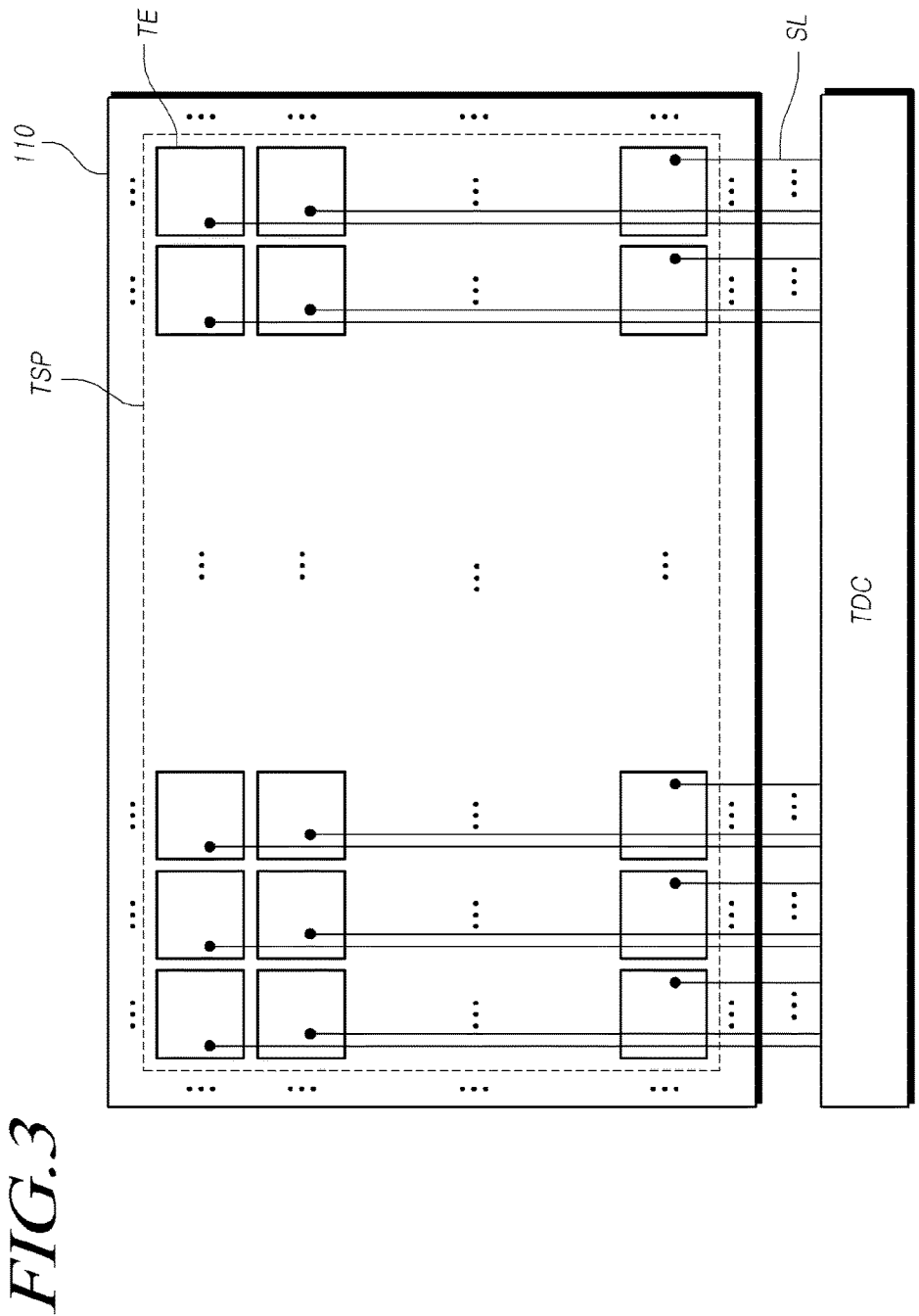
FIG. 3 is a schematic view illustrating the display panel of the display device having a built-in touchscreen according to exemplary embodiments.

FIG. 3 is a schematic view illustrating the display panel 110 of the display device 100 having a built-in touchscreen according to exemplary embodiments, in which the display panel 110 has a self-capacitance based touch sensing structure.

Referring to FIG. 3, the display device 100 having a built-in touchscreen according to exemplary embodiments has a touchscreen panel TSP disposed therewithin, the touchscreen panel TSP being an assembly of touch sensors.

Thus, the display device 100 having a built-in touchscreen according to exemplary embodiments may have touch electrodes TE acting as touch sensors disposed therewithin.

The display panel 110 having a built-in touchscreen may be an on-cell display panel, an in-cell display panel, or a hybrid type of on-cell and in-cell display panels.

The touch electrodes TE are electrically connected to a touch driving circuit TDC.

In this regard, signal lines SL through which the touch electrodes TE are connected to the touch driving circuit TDC are provided.

In the self-capacitance based touch sensing structure, the touch electrodes TE do not overlap each other and are electrically disconnected from each other within the display panel 110.

In addition, the signal lines SL do not overlap each other and are electrically disconnected from each other within the display panel 110.

When the display device 100 having a built-in touchscreen is a liquid crystal display (LCD) device, the touch electrodes TE may be common electrodes to which a common voltage is applied during a display mode period.

In this case, the touch electrodes TE may be electrically connected to each other within the touch driving circuit TDC during the display mode period.

Figure 4:
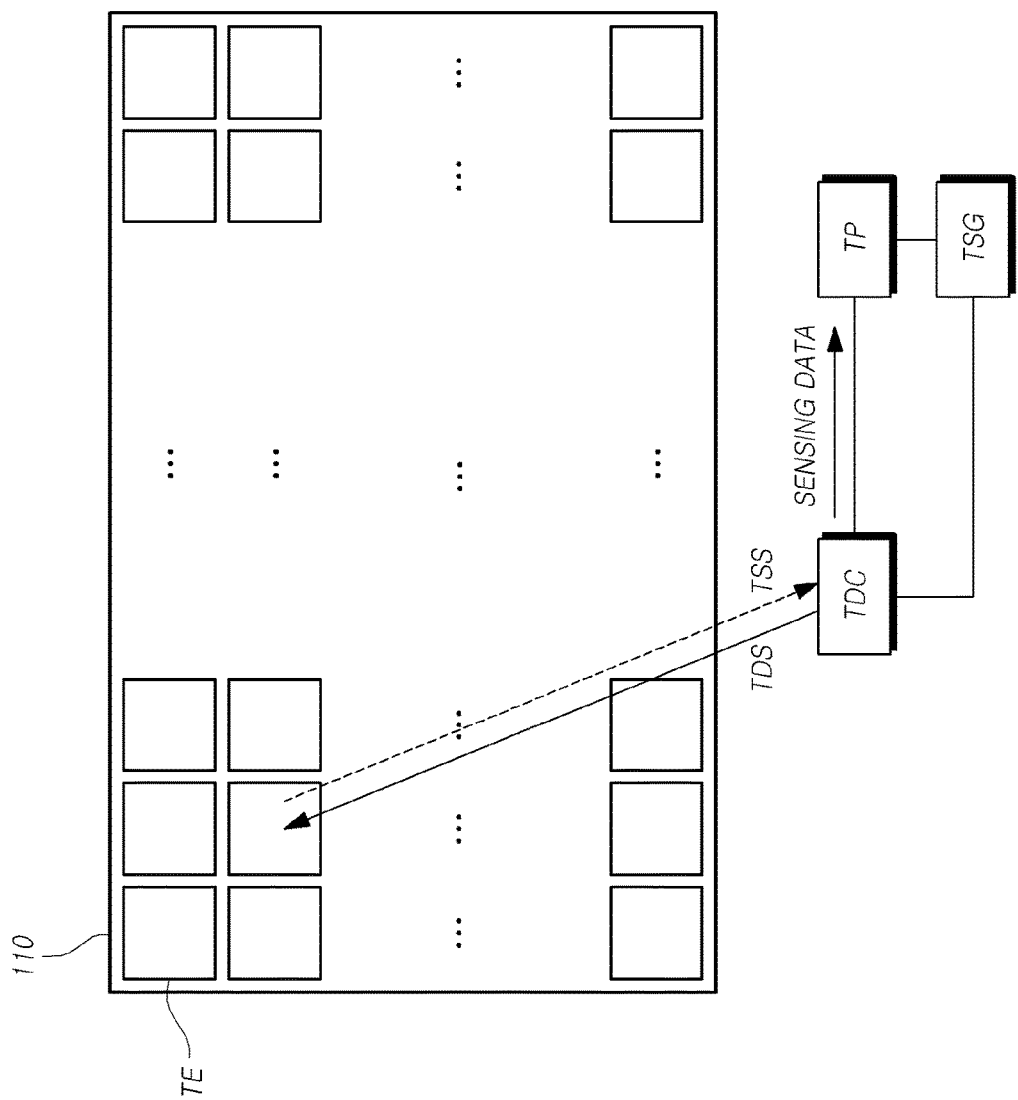
FIG. 4 is a schematic view illustrating a touch sensing system according to exemplary embodiments.

FIG. 4 is a schematic view illustrating a touch sensing system according to exemplary embodiments.

Referring to FIG. 4, the touch sensing system according to exemplary embodiments includes touch electrodes TE disposed within the display panel 110 having a built-in touchscreen, a touch driving circuit TDC receiving touch sensing signals TSS from the touch electrodes TE by driving the touch electrodes TE and outputting sensing data, a touch processor TP determining the occurrence of a touch and/or a touched position by detecting changes in capacitance from the touch electrodes TE based on the sensing data output by the touch driving circuit TDC, and so on.

When the touch driving circuit TDC drives the touch electrodes TE, the touch driving circuit TDC may drive the touch electrodes TE sequentially, at least one touch electrode at a time, or all of the touch electrodes TE simultaneously.

The touch driving circuit TDC outputs a touch driving signal TDS to a specific touch electrode TE that is intended to be driven.

A touch driving signal generating circuit TSG may be disposed inside or outside of the touch driving circuit TDC to generate a touch driving signal TDS.

In addition, the touch driving signal generating circuit TSG may be disposed inside or outside of the touch processor TP.

In some cases, the touch driving signal generating circuit TSG may be embodied as a separate power controller integrated circuit (IC).

The touch driving circuit TDC may be configured separately from or integrated with the touch processor TP.

The touch driving circuit TDC may be integrated with a display-related driving circuit (e.g. a source driving circuit or a gate driving circuit).

Figure 5:
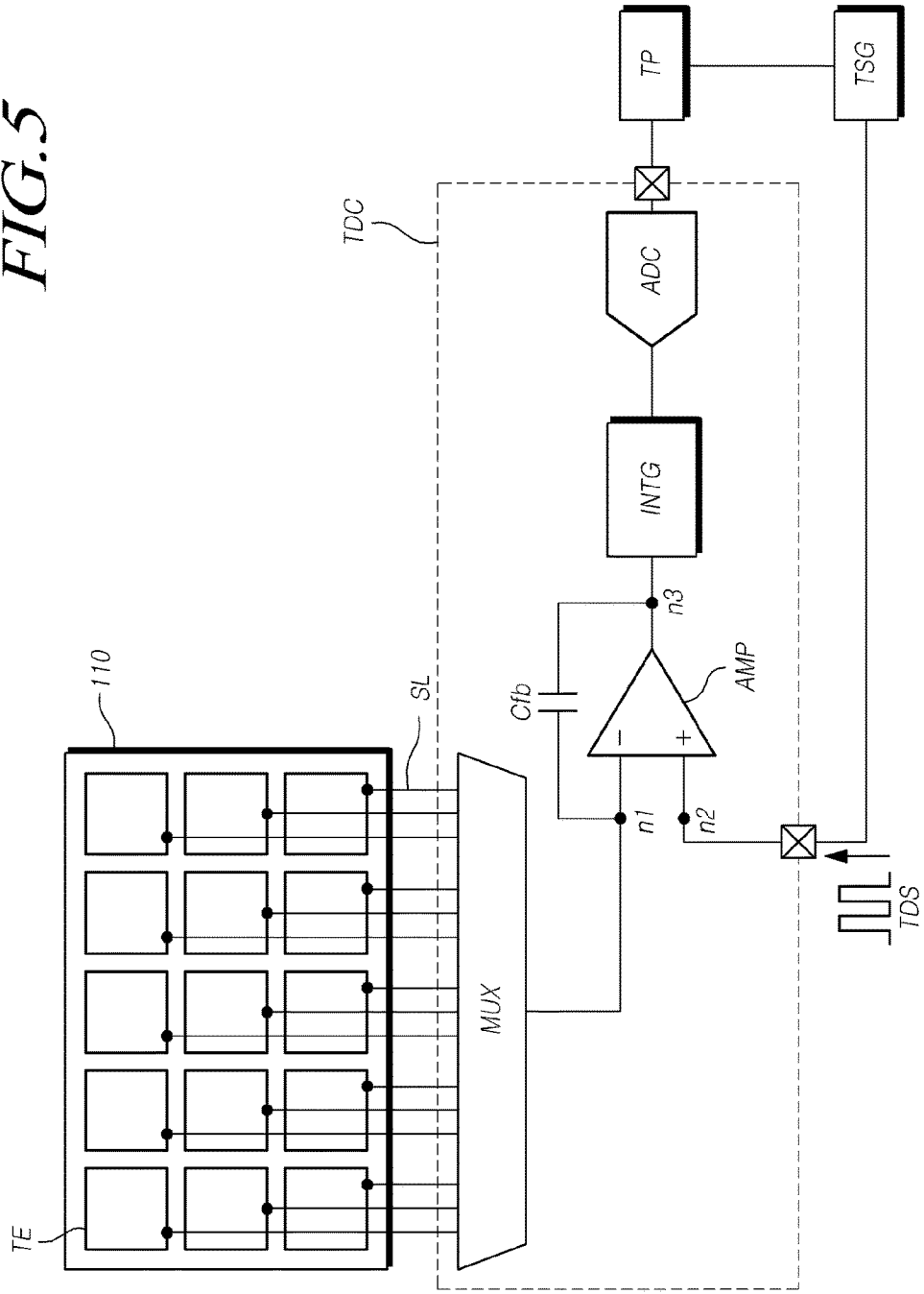
FIG. 5 is a schematic view illustrating a touch driving circuit TDC according to exemplary embodiments.

FIG. 5 is a schematic view illustrating a touch driving circuit TDC according to exemplary embodiments.

Referring to FIG. 5, as described above, the touch driving circuit TDC can drive at least one of a number of touch electrodes TE by outputting a touch driving signal TDS to at least one of a number of signal lines SL at a specific point in time.

The touch driving circuit TDC can drive the touch electrodes TE simultaneously by outputting touch driving signals TDS to all of the signal lines SL.

FIG. 5 illustrates a simple and conceptual structure of the touch driving circuit TDC, which may include a preamplifier AMP, an integrator INTG, an analog-to-digital converter ADC, a feedback capacitor Cfb, a multiplexer MUX, and so on.

The pre-amplifier APM includes a first terminal n1 electrically connected to at least one touch electrode TE, a second terminal n2 to which a touch driving signal TDS is applied, and an output terminal n3 through which a touch sensing signal TSS is output.

The feedback capacitor Cfb is connected between the first terminal n1 and the output terminal n3 of the pre-amplifier AMP.

The feedback capacitor Cfb may be a fixed capacitor having fixed capacitance or a variable capacitor having variable capacitance.

In addition, the feedback capacitor Cfb may be comprised of several capacitors. When the feedback capacitor Cfb is a variable capacitor, the feedback capacitor Cfb may be comprised of several capacitors and several switches.

The integrator INTG outputs an integrated value of a voltage output by the pre-amplifier AMP (i.e. a touch sensing signal output through the output terminal n3 of the pre-amplifier AMP). The integrator INTG may be comprised of circuit elements, such as a comparator and a capacitor.

The analog-to-digital converter ADC converts a voltage (i.e. an integrated value) output by the integrator INTG to a digital value and outputs the digital value as a sensing value.

The touch driving circuit TDC sends sensing data, including at least one sensing value of the at least one touch electrode TE, to the touch processor TP.

The multiplexer MUX can output a touch driving signal TDS to at least one among the signal lines SL connected to at least one among the touch electrodes TE intended to be driven.

Although a single multiplexer MUX is conceptually illustrated in FIG. 5, two or more multiplexers MUX may be provided inside of the touch driving circuit TDC.

The multiplexer MUX may be located outside of the touch driving circuit TDC.

Figure 6:
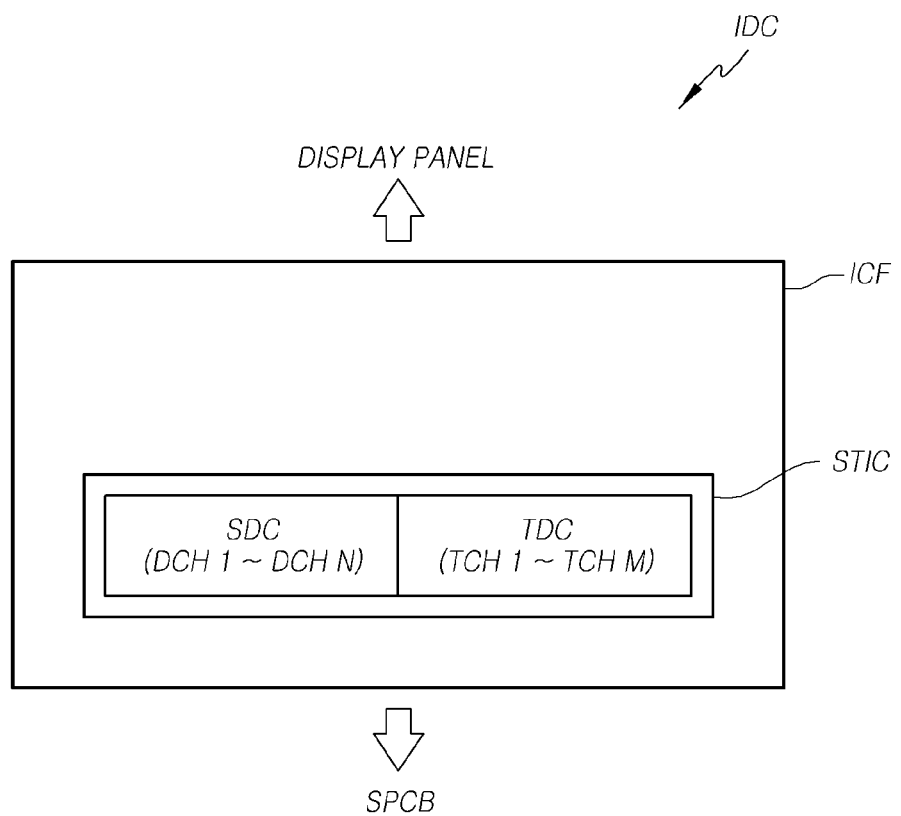
FIG. 6 and FIG. 7 are schematic views illustrating COF type integrated driving circuits according to exemplary embodiments.
Figure 7:
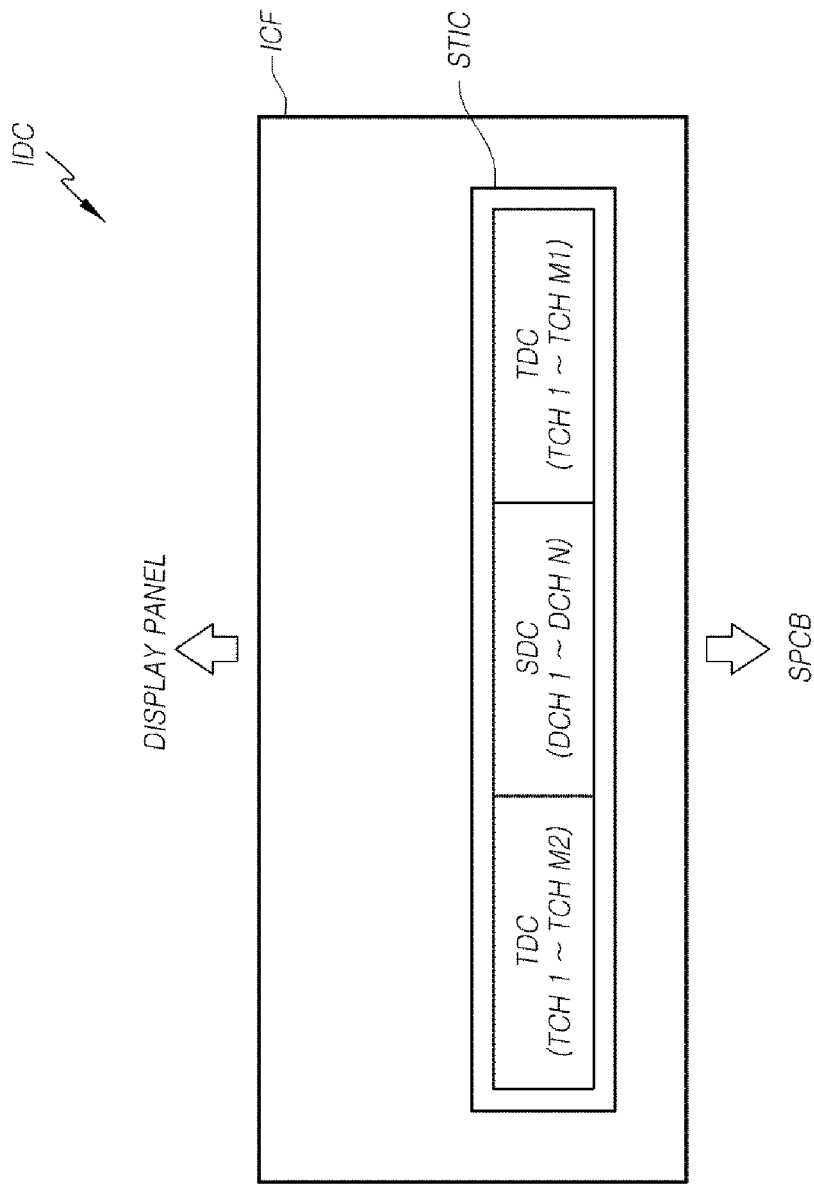

FIG. 6 and FIG. 7 are schematic views illustrating COF type integrated driving circuits IDC according to exemplary embodiments.

Referring to FIG. 6 and FIG. 7, at least one source driving circuit SDC may be integrated with at least one touch driving circuit TDC.

FIG. 6 illustrates a COF type integrated driving circuit IDC in which a single source driving circuit SDC is integrated with a single touch driving circuit TDC, while FIG. 7 illustrates a COF type integrated driving circuit IDC in which a single source driving circuit SDC is integrated with two touch driving circuits TDC.

The number of source driving circuits SDC and the number of touch driving circuits TDC integrated in the COF type integrated driving circuit IDC may vary depending on the number of data lines and the number of touch electrodes in the display panel 110, the number of data channels and the number of touch channels, the size of an area in which the COF type integrated driving circuit IDC is connected to the display panel 110, or the like.

Referring to FIG. 6 and FIG. 7, the COF type integrated driving circuit IDC includes an integrated driving chip STIC and an integrated circuit (IC) film ICF. The integrated driving chip STIC includes at least one source driving circuit SDC and at least one touch driving circuit TDC.

The integrated driving circuit IDC and the IC film ICF include the term "integrated" added to the driving circuit and the circuit film to indicate the concurrent presence of components related to data driving and touch driving, and may be simply referred to as the driving circuit and the circuit film hereinafter.

Data channel lines are disposed on the IC film ICF and are electrically connected to data channels DCH 1 to DCH N of the source driving circuit SDC in a corresponding manner. The data channels DCH 1 to DCH N may be referred to as output nodes (output ports, or output terminals) through which data voltages are output.

Touch channel lines are disposed on the IC film ICF and are electrically connected to touch channels TCH 1 to TCH M of the touch driving circuit TDC (FIG. 6) or touch channels TCH 1 to TCH M1 and TCH 1 to TCH M2 of the touch driving circuits TDC (FIG. 7) in a corresponding manner. The touch channels TCH 1 to TCH M, TCH 1 to TCH M1, and TCH 1 to TCH M2 may be referred to as output nodes (output ports, or output terminals) through which touch driving signals are output.

One end of the IC film ICF is to be electrically connected (or bonded) to a bonding portion of the display panel 110, while the other end (opposite end) of the IC film ICF is to be electrically connected (or bonded) to a bonding portion of a source printed circuit board SPCB.

Referring to FIG. 7, when the source driving circuit SDC and the two touch driving circuits TDC are mounted on the IC film ICF, the source driving circuit SDC is disposed on the central portion of the IC film ICF.

On the IC film ICF, the two touch driving circuits TDC are disposed on both sides (opposite end) of the source driving circuit SDC.

Due to this configuration, the integrated driving circuit IDC can be embodied to be suitable to the arrangement of data lines and touch electrodes (as well as signal lines connected to the touch lines) driven by the integrated driving chip STIC mounted on the IC film ICF. This consequently allows the arrangement of the data channel lines and the touch channel lines on the IC film ICF to be balanced and compact as well as the arrangement of link lines (i.e., lines connecting the data lines to the bonding portions of the display panel) and signal lines (i.e. lines connecting the touch electrodes to the bonding portions of the display panel) in peripheral areas of the display panel 110 to be balanced and compact.

As an alternative embodiment, the integrated driving chip STIC may include two source driving circuits SDC and three touch driving circuits TDC.

In this case, the source driving circuits SDC and the touch driving circuits TDC may be arranged in the sequence of the first touch driving circuit TDC, the first source driving circuit SDC, the second touch driving circuit TDC, the second source driving circuit SDC, and the third touch driving circuit TDC.

In general, the integrated driving chip STIC includes X source driving circuits SDC and Y touch driving circuits TDC, where X is a natural number equal to or greater than 1, and Y is a natural number equal to or greater than 1.

Although both X and Y may be even numbers or odd numbers, one of X and Y may be an even number and the other of X and Y may be an odd number considering the arrangement of a variety of lines. For example, X may be an even number and Y may be an odd number. For example, X may be Y+1. This may be advantageous for right and left balance and compactness of the arrangement of lines.

In addition, the source driving circuits SDC may alternate with the touch driving circuits TDC.

Figure 8:
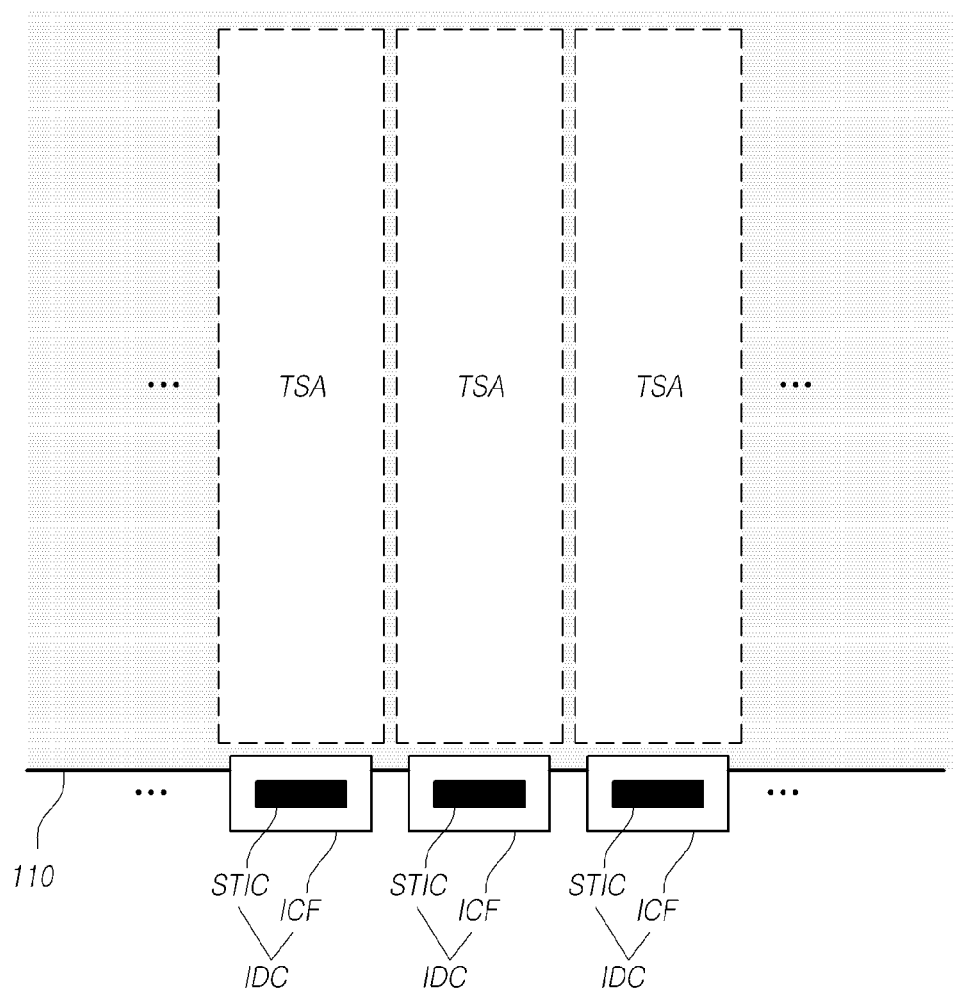
FIG. 8 is a schematic view illustrating touch sensing areas of COF type integrated driving circuits according to exemplary embodiments.

FIG. 8 is a schematic view illustrating touch sensing areas TSA of COF type integrated driving circuits IDC according to exemplary embodiments.

Referring to FIG. 8, the COF type integrated driving circuits IDC according to exemplary embodiments perform touch sensing in areas in which touch electrodes TE electrically connected thereto are located.

The areas in which the touch electrodes TE electrically connected to the integrated driving circuits IDC are located are referred to as touch sensing areas TSA.

The touch sensing areas TSA correspond to areas (i.e. data driving areas) in which data lines DL electrically connected to the integrated driving circuits IDC are located.

Figure 9:
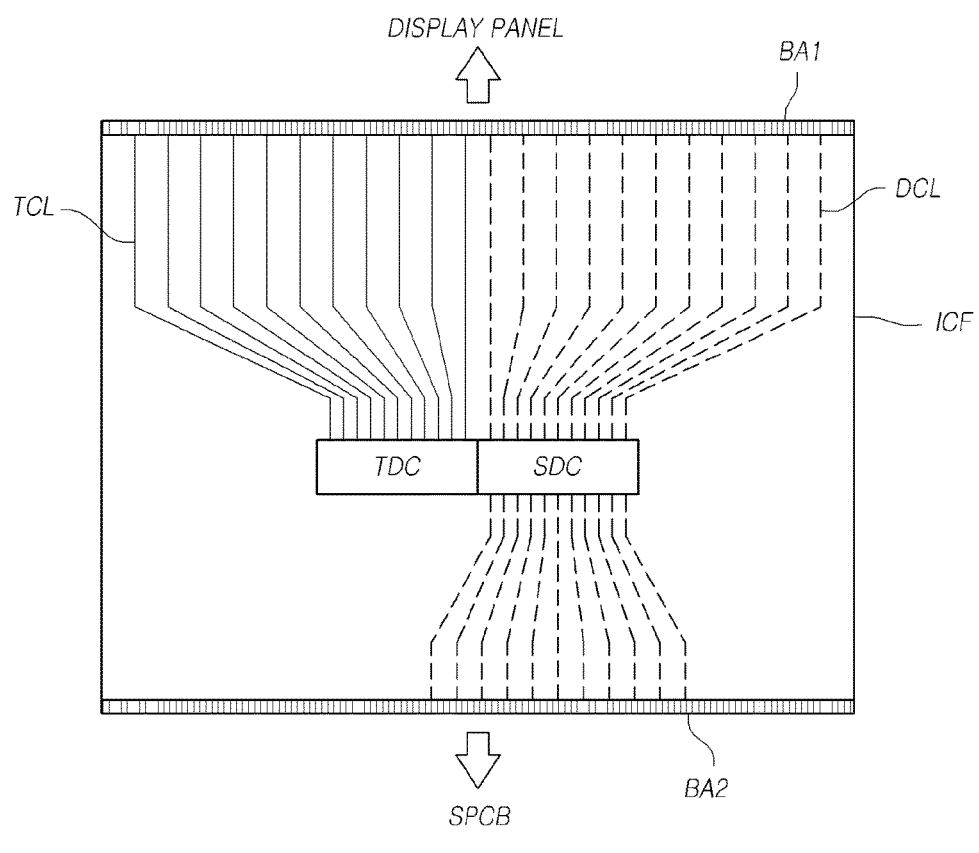
FIG. 9 is a schematic view illustrating data channel lines and touch channel lines on an IC film when a COF type integrated driving circuit according to exemplary embodiments has a single touch driving circuit.

FIG. 9 is a schematic view illustrating data channel lines DCL and touch channel lines TCL on an IC film ICF when a COF type integrated driving circuit IDC according to exemplary embodiments has a single touch driving circuit TDC.

Referring to FIG. 9, in the COF type integrated driving circuit IDC, the IC film ICF includes a first bonding area BA1 to be connected (or bonded) to the display panel 110 and a second bonding area BA2 to be connected (or bonded) to a source printed circuit board SPCB.

An integrated driving chip STIC including a source driving circuit SDC and a touch driving circuit TDC, data channel lines DCL, and touch channel lines TCL are disposed between the first bonding area BA1 and the second bonding area BA2 located on one end and the other end (opposite end) of the IC film ICF.

Figure 10:
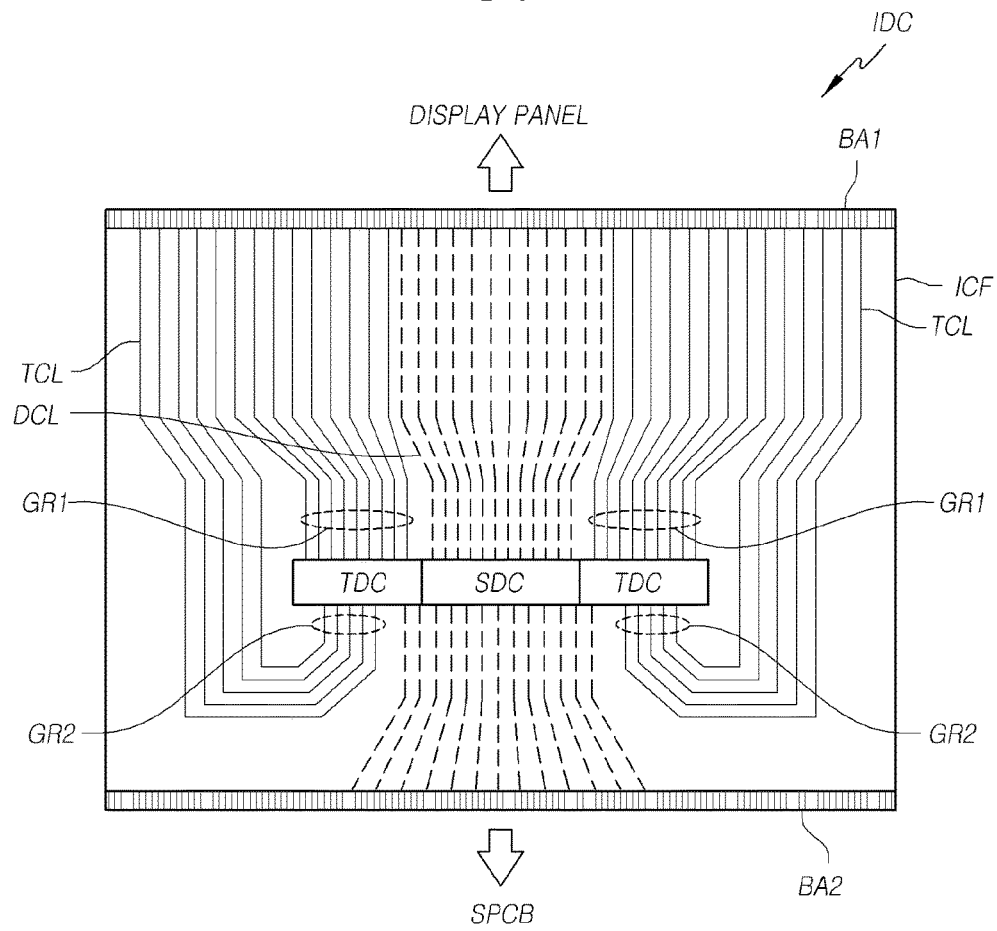
FIG. 10 is a schematic view illustrating data channel lines and touch channel lines on an IC film when a COF type integrated driving circuit according to exemplary embodiments has two touch driving circuits.

FIG. 10 is a schematic view illustrating data channel lines DCL and touch channel lines TCL on an IC film ICF when a COF type integrated driving circuit IDC according to exemplary embodiments has two touch driving circuits TDC.

Referring to FIG. 10, in the COF type integrated driving circuit IDC, the IC film ICF includes a first bonding area BA1 to be connected (or bonded) to the display panel 110 and a second bonding area BA2 to be connected (or bonded) to a source printed circuit board SPCB.

An integrated driving chip STIC including a source driving circuit SDC and two touch driving circuits TDC, data channel lines DCL, and touch channel lines TCL are disposed between the first bonding area BA1 and the second bonding area BA2 located on one end and the other end (opposite end) of the IC film ICF.

In the integrated driving chip STIC, the source driving circuit SDC is located in the center, while the two touch driving circuits TDC are located on both sides (opposite end) of the source driving circuit SDC.

Referring to FIG. 10, a first group GR1 of touch channel lines among the touch channel lines TCL on the IC film ICF is connected to one side of the touch driving circuit TDC, while a second group GR2 of touch channel lines among the touch channel lines TCL on the IC film ICF is connected to the other side (opposite end) of the touch driving circuit TDC.

Referring to FIG. 10, the first bonding area BA1 is located on one end of the IC film ICF and is to be electrically connected to the display panel 110.

In each of the touch channel lines TCL belonging to the first group GR1, one end of each touch channel line is connected to the one side of the touch driving circuit TDC, while the other end (opposite end) of each touch channel line is connected to the bonding area BA1.

In each of the touch channel lines TCL belonging to the second group GR2, one end of each touch channel line is connected to the other side (opposite end) of the touch driving circuit TDC, an intermediate portion of each touch channel line is located on a side surface of the touch driving circuit TDC, and the other end (opposite end) of each touch channel line is connected to the bonding area BA1.

As described above, not all of the number of touch channel lines TCL are connected to the one side (i.e., to the same side) of the touch driving circuit TDC of the integrated driving chip STIC. Rather, the touch channel lines TCL of the first group GR1 are connected to the one side of the touch driving circuit TDC, while the touch channel lines of the second group GR2 are connected to the other side (opposite side) of the touch driving circuit TDC, whereby the width of the touch driving circuit TDC can be reduced. This can consequently reduce the size of the integrated driving chip STIC.

Figure 11:
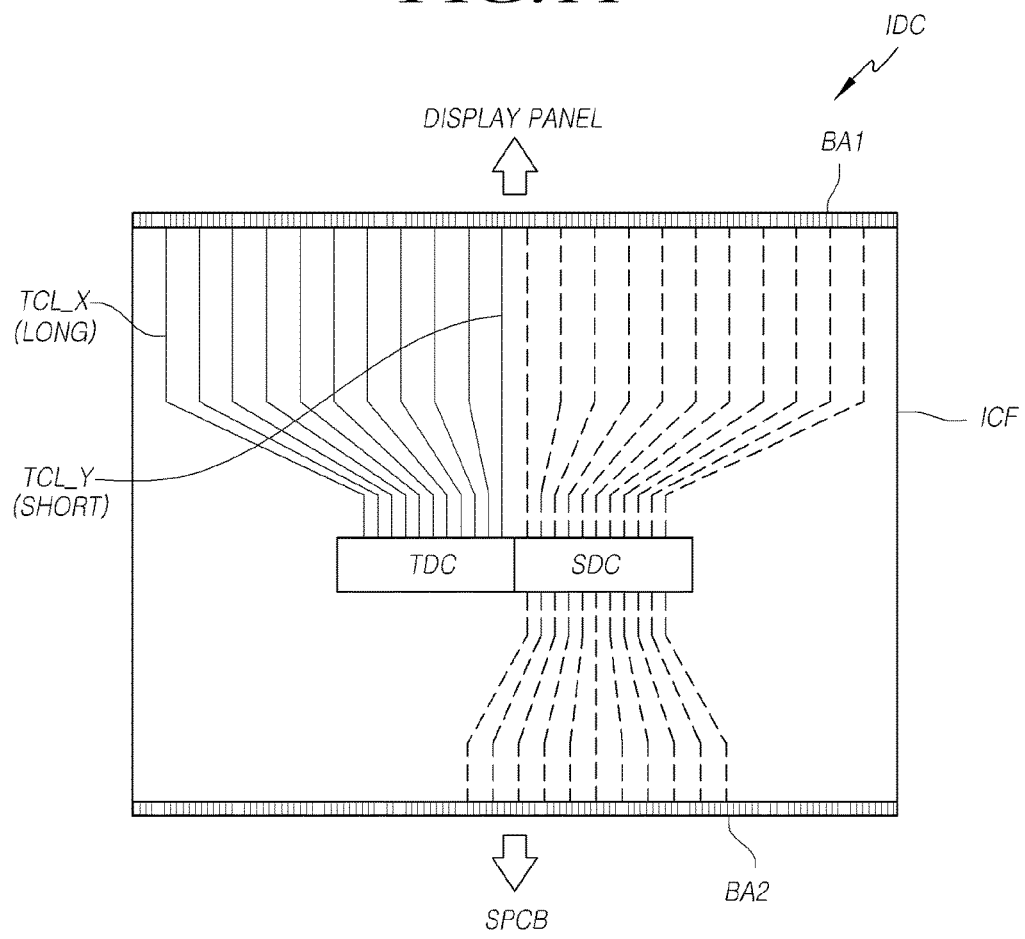
FIG. 11 is a schematic view illustrating outermost touch channel lines among a number of touch channel lines on an IC film when the COF type integrated driving circuit according to exemplary embodiments has a single touch driving circuit.
Figure 12:
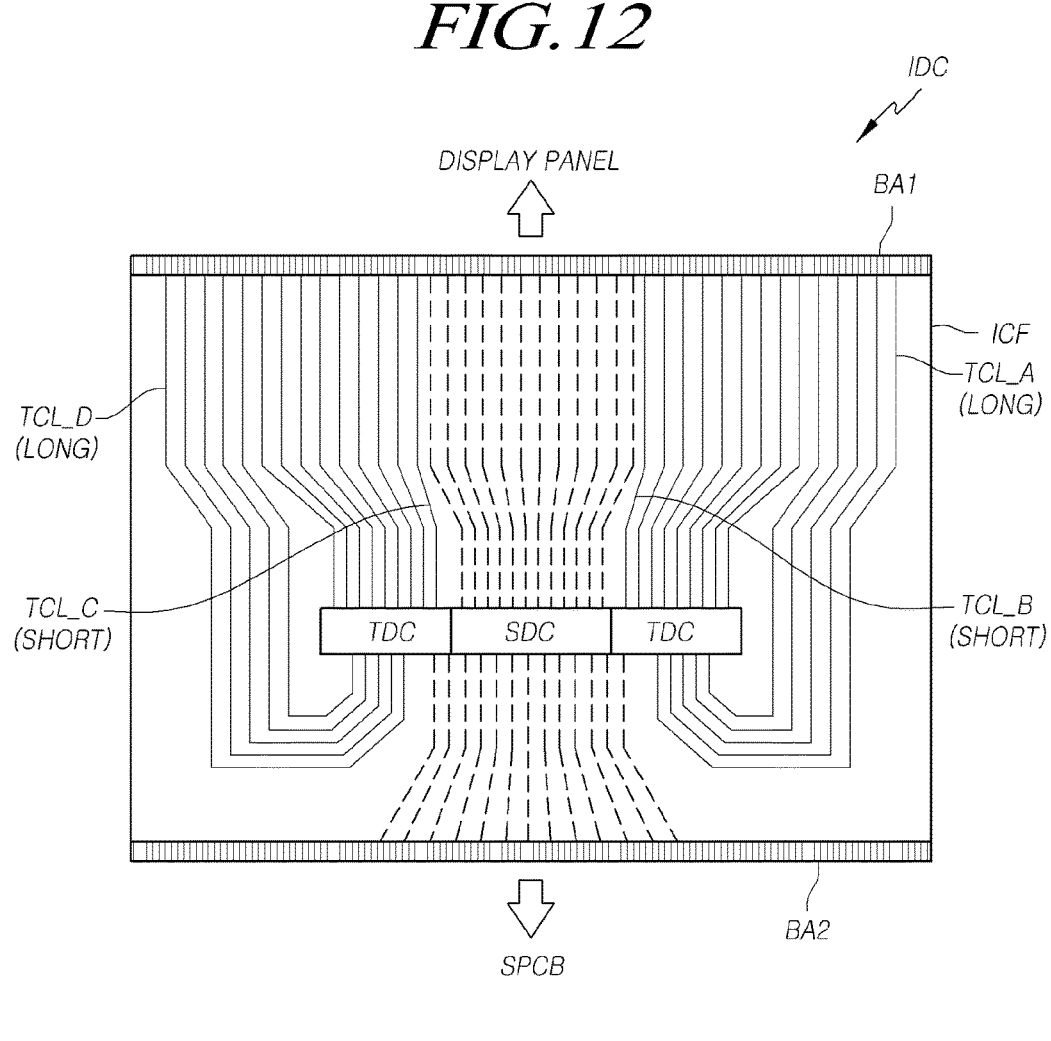
FIG. 12 is a schematic view illustrating outermost touch channel lines among a number of touch channel lines on an IC film when the COF type integrated driving circuit according to exemplary embodiments has two touch driving circuits.

FIG. 11 and FIG. 12 are schematic views illustrating outermost touch channel lines among touch channel lines TCL on an IC film ICF of a COF type integrated driving circuit IDC according to exemplary embodiments.

Referring to FIG. 11, the touch channel lines TCL on the IC film ICF on which a single touch driving circuit TDC is mounted include a first outermost touch channel line TCL_X and a second outermost touch channel line TCL_Y.

Referring to FIG. 11, the length of the first outermost touch channel line TCL_X is greater than the length of the second outermost touch channel line TCL_Y.

Referring to FIG. 12, the touch channel lines TCL on the IC film ICF on which two touch driving circuits TDC are mounted include touch channel lines TCL connected to a touch driving circuit TDC located on one side of a source driving circuit SDC and touch channel lines TCL connected to a touch driving circuit TDC located on the other side (opposite side) of the source driving circuit SDC.

The touch channel lines TCL connected to each of the touch driving circuits TDC include first and second outermost touch channel lines located in both outermost positions.

The touch channel lines TCL connected to the touch driving circuit TDC located on the one side of the source driving circuit SDC include a first outermost touch channel line TCL_A and a second outermost touch channel line TCL_B located in both outermost positions (e.g., left and right outermost positions).

The touch channel lines TCL connected to the touch driving circuit TDC located on the other side (opposite side) of the source driving circuit SDC include a first outermost touch channel line TCL_D and a second outermost touch channel line TCL_C located in both outermost positions (e.g., left and right outermost positions).

The symbol used herein, "TCL_(capital letter)," indicates outermost touch channel lines.

Referring to FIG. 12, the first outermost touch channel lines TCL_A and TCL_D are longer than the second outermost touch channel lines TCL_B and TCL_C.

The first outermost touch channel lines TCL_A and TCL_D are located in outer positions in the entirety of the IC film ICF, compared to the second outermost touch channel lines TCL_B and TCL_C. For example, the touch channel lines TCL_A and TCL_D may be located at outermost positions of all signal lines of the IC film ICF.

That is, the length of the touch channel line TCL may increase as the touch channel line TCL is located more distantly from the center of the IC film ICF.

Since the length of the touch channel line TCL increases as the touch channel line TCL is located more distantly from the center of the IC film ICF as described above, it is possible to increase the distances between the touch channel lines TCL to levels capable of preventing signal interference between the touch channel lines TCL while maintaining the distances between the touch channel lines TCL to be equal at all points.

Consequently, accurate touch driving signals can be supplied to the touch channel lines TCL, and accurate touch sensing signals TSS can be detected through the touch channel lines TCL, whereby the accuracy of touch sensing can be advantageously improved.

The integrated driving circuit IDC having the integrated driving chip STIC (see FIG. 6 and FIG. 7) mounted on the IC film ICF may suffer from several problems due to the essential characteristics of the COF type circuit and the arrangement of the lines on the IC film ICF.

Among such problems, a severe problem may occur in the case in which a touch channel line TCL is only located on one side of a specific touch channel line TCL among the touch channel lines TCL disposed on the IC film ICF. In this case, noise may occur during touch driving, thereby causing an error in the result of touch sensing.

Hereinafter, the problem of noise will be described briefly.

Figure 13:
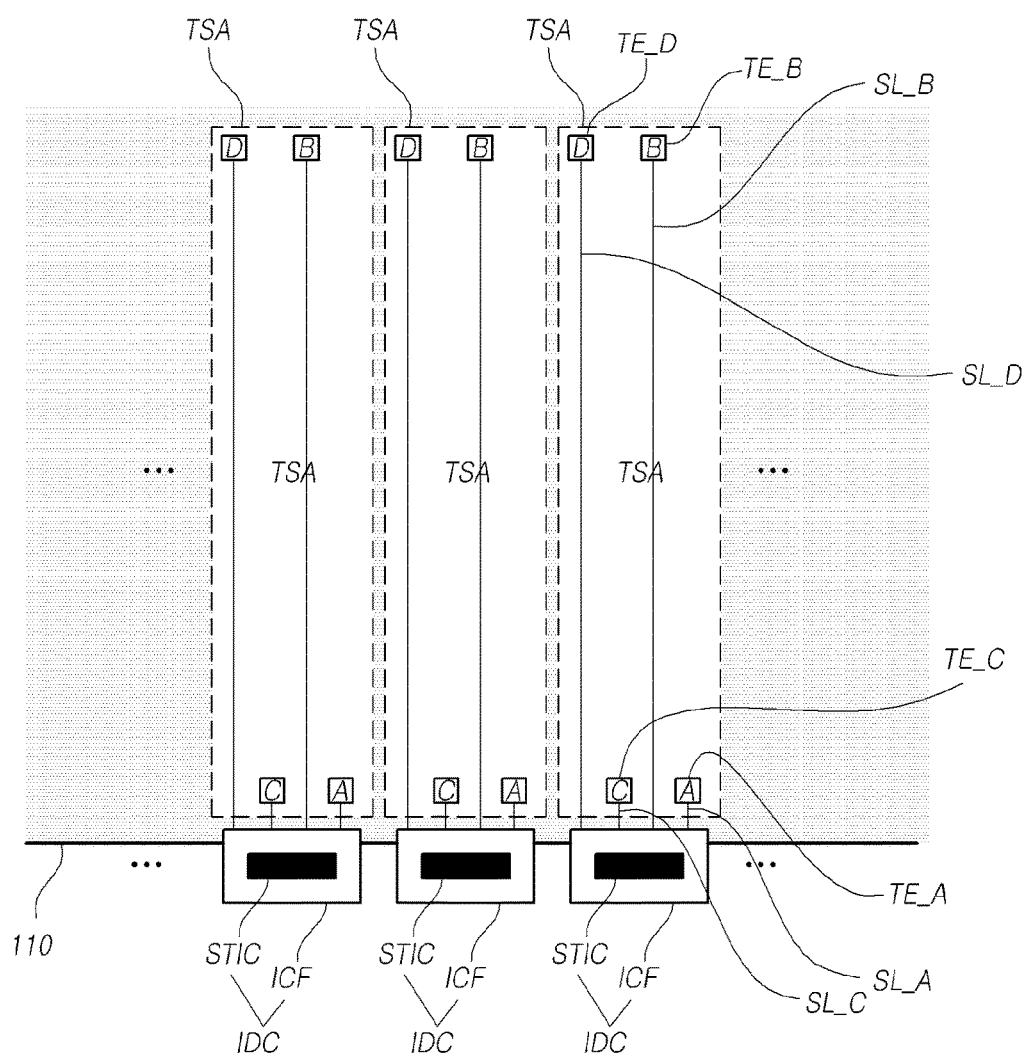
FIG. 13 is a schematic view illustrating touch electrodes corresponding to outermost touch channel lines among a number of touch channel lines disposed on IC films when the COF type integrated driving circuit according to exemplary embodiments has two touch driving circuits.

FIG. 13 is a schematic view illustrating touch electrodes TE_A, TE_B, TE_C, and TE_D corresponding to outermost touch channel lines TCL_A, TCL_B, TCL_C, and TCL_D among touch channel lines TCL disposed on IC films ICF in COF type integrated driving circuits IDC as illustrated in FIG. 12.

Referring to FIG. 13, in each of the integrated driving circuits IDC, four outermost touch channel lines TCL_A, TCL_B, TCL_C, and TCL_D connected to two touch driving circuits TDC of an integrated driving chip STIC are disposed on an IC film ICF.

The four outermost touch channel lines TCL_A, TCL_B, TCL_C, and TCL_D on the IC film ICF are electrically connected to four signal lines SL_A, SL_B, SL_C, and SL_D, respectively, on the display panel 110 in a corresponding manner.

The four signal lines SL_A, SL_B, SL_C, and SL_D are electrically connected to four touch electrodes TE_A, TE_B, TE_C, and TE_D, respectively, in a corresponding manner.

According to the connection structure of the touch electrodes and touch signals, referring to FIG. 12 together with FIG. 13, the first outermost touch channel line TCL_A connected to the touch driving circuit TDC located on one side of the source driving circuit SDC may be connected to the touch electrode TE_A located at point A that is closer (or farther) than point B via the signal line SL_A, while the second outermost touch channel line TCL_B connected to the touch driving circuit TDC located on the one side of the source driving circuit SDC may be connected to the touch electrode TE_A located at point B that is farther (or closer) than point A via the signal line SL_B.

In addition, the second outermost touch channel line TCL_C connected to the touch driving circuit TDC located on the other side (opposite side) of the source driving circuit SDC may be connected to the touch electrode TE_C located at point C that is closer (or farther) than point D via the signal line SL_C, while the first outermost touch channel line TCL_D connected to the touch driving circuit TDC located on the other side (opposite side) of the source driving circuit SDC may be connected to the touch electrode TE_C located at point D that is farther (or closer) than point C via the signal line SL_D.

As illustrated in FIG. 13, the touch electrode TE_A at point A and the touch electrode TE_C at point C are located relatively closer to the integrated driving circuit IDC, while the touch electrode TE_B at point B and the touch electrode TE_D at point D are located relatively farther from the integrated driving circuit IDC. That is, point A and point C are relatively closer to the integrated driving circuit IDC, while point B and point D are relatively farther from the integrated driving circuit IDC.

It should be understood, however, that this configuration is an exemplary illustration of the arrangement of the touch electrodes and the signal lines taken for the sake of brevity, and the touch electrodes may be located in a variety of positions.

For example, point A and point C may be relatively farther from the integrated driving circuit IDC, while point B and point D may be relatively closer to the integrated driving circuit IDC.

In another example, point A and point D may be located to be symmetrical to each other and point B and point C may be located to be symmetrical to each other with respect to the center of a touch sensing area TSA in charge of the integrated driving circuit IDC.

In further another example, point A, point B, point C, and point D may be located sequentially to be farther away from the integrated driving circuit IDC. (That is, point A is closest to the integrated driving circuit IDC, while point D is farthest from the integrated driving circuit IDC.)

In another example, point A, point B, point C, and point D may be located sequentially to be closer to the integrated driving circuit IDC. (That is, point A is farthest from the integrated driving circuit IDC, while point D is closest to the integrated driving circuit IDC.)

In still another example, point A, point B, point C, and point D may be located in corresponding positions in every touch sensing area TSA or may be symmetrical with respect to boundaries of touch sensing areas.

Figure 14:
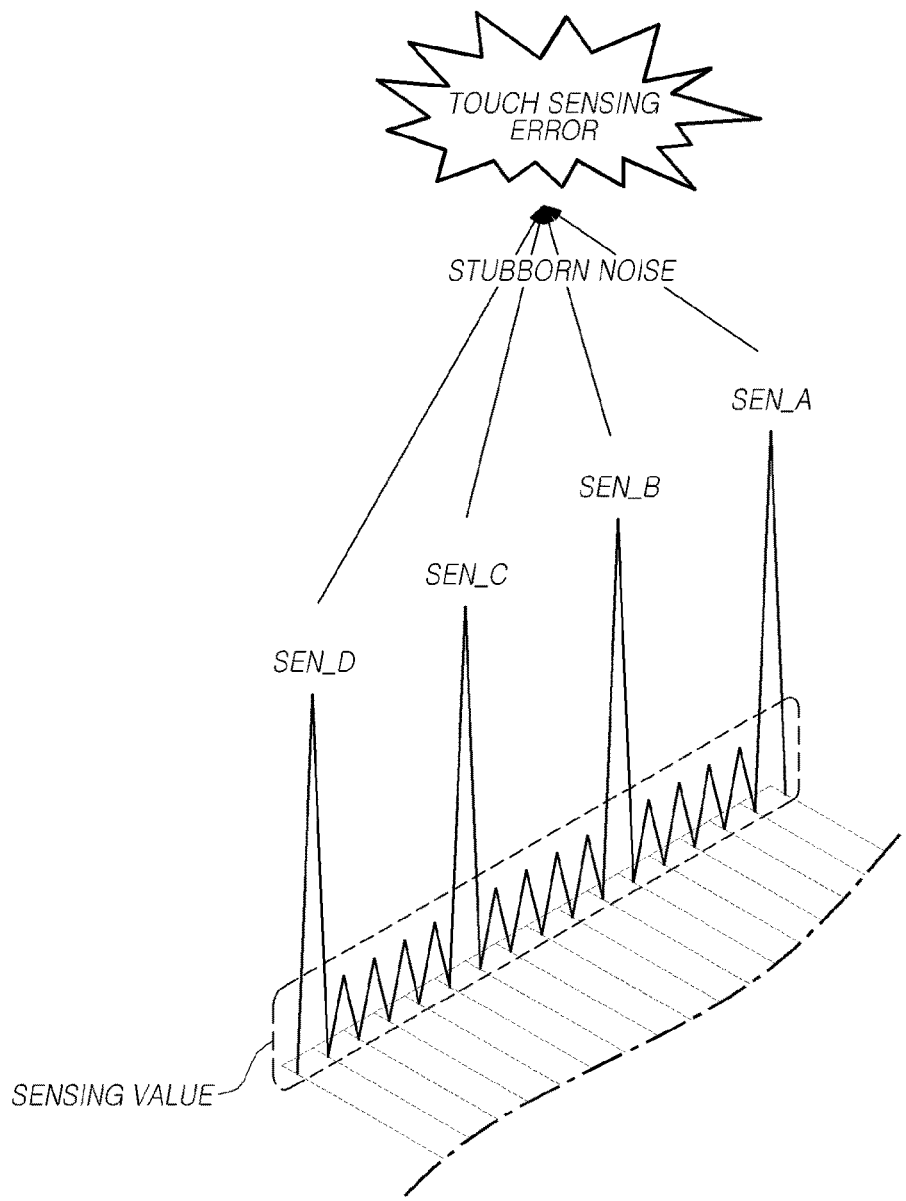
FIG. 14 is a schematic view illustrating sensing values obtained using a COF type integrated driving circuit according to exemplary embodiments.

FIG. 14 is a schematic view illustrating sensing values obtained using a COF type integrated driving circuit IDC according to exemplary embodiments.

FIG. 14 graphically represents sensing values obtained through touch channels (or touch channel lines TCL) of the integrated driving circuit IDC, in which the heights of the sharply risen points correspond to the sizes of the sensing values. The sensing values may be values that the integrated driving circuit IDC has obtained by receiving touch sensing signals TSS from touch electrodes TE through touch sensing channels and converting the received touch sensing signals TSS to digital values using an analog-to-digital converter ADC.

The problem of the occurrence of noise will be described with reference to FIG. 14 together with FIG. 13.

Referring to FIG. 13, in the case of each of outermost touch channel lines among the touch channel lines TCL on the IC film ICF, a touch channel line is located adjacent to one side thereof, while no touch channel line is present adjacent to the other side (opposite side) thereof. In contrast, with respect to the touch channel lines other than the outermost touch channel lines, touch channel lines are adjacent to both sides of touch channel lines.

That is, an adjacent touch channel line is located close to one side of each of outermost touch channel lines, while no line or a different type of data channel line is present on the other side of each of outermost touch channel lines.

In the case of the first outermost touch channel lines TCL_X, TCL_A, and TCL_D, a touch channel line is located close to one side thereof, while no line is present on the other side (opposite side) thereof.

In the case of the second outermost touch channel lines TCL_Y, TCL_B, and TCL_C, a touch channel line is located close to one side thereof, while a data channel line is present on the other side (opposite side) thereof.

Thus, in a touch mode period, touch driving signals TDS are applied to touch channel lines adjacent to both sides of a touch channel line other than the outermost touch channel lines, while a touch driving signal TDS is applied to a single touch channel line adjacent to only one side of an outermost touch channel line.

That is, in the case of the first outermost touch channel lines TCL_X, TCL_A, and TCL_D, a touch driving signal TDS is applied to a touch channel line located adjacent to one side thereof, while the other side thereof is in an electrically-off state with no signal being applied thereto.

In the case of the second outermost touch channel lines TCL_Y, TCL_B, and TCL_C, a touch driving signal TDS is applied to a touch channel line located adjacent to one side thereof, while a voltage different from the touch driving signal TDS or no voltage may be applied to a data channel line located on the other side thereof.

Thus, as illustrated in FIG. 14, sensing values SEN_A, SEN_B, SEN_C, and SEN_D obtained from the touch electrodes TE_A, TE_B, TE_C, and TE_D at points A, B, C, and D electrically connected to the outermost touch channel lines TCL_A, TCL_B, TCL_C, and TCL_D are significantly greater than sensing values obtained from touch electrodes at points other than points A, B, C, and D.

Due to significantly high sensing values as described above, points A, B, C, and D may be misconceived as touched positions without being actually touched.

Thus, the sensing values obtained from the touch electrodes TE_A, TE_B, TE_C, and TE_D at points A, B, C, and D electrically connected to the outermost touch channel lines TCL_A, TCL_B, TCL_C, and TCL_D are referred to as "noise" that would cause touch sensing errors.

Such noise occurs in specific positions corresponding to outermost touch channels (or touch channel lines) due to the essential characteristics of COF type integrated driving circuits IDC and the characteristics of the arrangement of lines on IC films ICF. It is difficult to remove or control such noise, which is thus referred to as "stubborn noise" herein (in other words, persistent noise).

While stubborn noise generally occurs inside of the display panel 110, stubborn noise may be induced by the structure of IC films ICF located outside of the display panel 110. When signals are received by integrated driving circuits IDC, such stubborn noise can be observed.

When the characteristics of a signal to be received by an integrated driving circuit IDC are altered due to signal interference such that no ordinary signal is detected, stubborn noise as described above may be formed, thereby causing a sensing error.

For example, noise that would alter the signal characteristics as described above may be formed due to the arrangement of lines on a circuit film (e.g. the arrangement of data channel lines or the arrangement of touch channel lines) when a signal flowing through a specific touch channel line interferes with signals flowing through surrounding lines (e.g., the arrangement of data channel lines or the arrangement of touch channel lines).

In addition, stubborn noise may be any cause of preventing the integrated driving circuit IDC from ordinarily detecting a signal, thereby creating a sensing error.

Hereinafter, a COF type integrated driving circuit IDC configured to remove such stubborn noise will be described.

Figure 15:
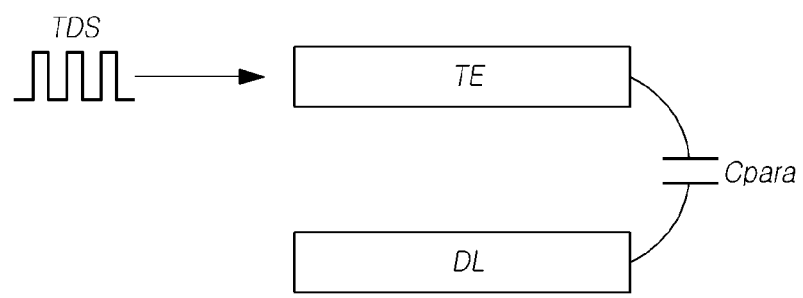
FIG. 15 is a schematic view illustrating parasitic capacitance formed in the display device having a built-in touchscreen according to exemplary embodiments.

FIG. 15 is a schematic view illustrating parasitic capacitance Cpara formed in the display device 100 having a built-in touchscreen according to exemplary embodiments.

Referring to FIG. 15, during a touch mode period, when a touch driving signal TDS is applied to a touch electrode TE, an undesirable parasitic capacitance Cpara may be formed between the touch electrode TE and another electrode (e.g. a data line DL, a gate line GL, or another touch electrode).

The parasitic capacitance may increase a resistive-capacitive (RC) delay in the touch electrode TE, act as a load in the touch electrode TE, and change capacitance (e.g. capacitance between a pointer and a touch electrode) to be detected for touch sensing, thereby reducing the accuracy of touch sensing.

Although only the parasitic capacitance Cpara formed between the data line DL and the touch electrode TE is illustrated in FIG. 15, parasitic capacitance may be formed between a gate line GL and a touch electrode TE and between a touch electrode TE that is being driven and a surrounding touch electrode TE.

Figure 16:
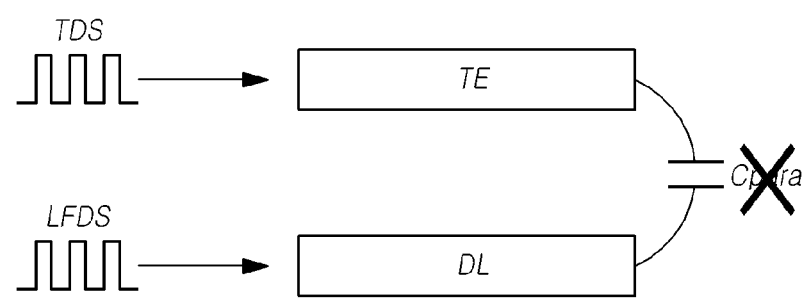
FIG. 16 is a schematic view illustrating load-free driving intended to prevent parasitic capacitance from being formed in the display device having a built-in touchscreen according to exemplary embodiments.

FIG. 16 is a schematic view illustrating load-free driving intended to prevent parasitic capacitance Cpara from being formed in the display device 100 having a built-in touchscreen according to exemplary embodiments.

Referring to FIG. 16, while a touch driving signal TDS is being applied to a touch electrode TE, a load-free driving signal LFDS may be applied to a data line DL to remove or reduce parasitic capacitance Cpara.

Load-free driving indicates the process of applying the load-free driving signal LFDS to the data line DL while the touch driving signal TDS is being applied to the touch electrode TE.

The load-free driving signal LFDS may be a touch driving signal TDS or may be a signal in-phase with the touch driving signal TDS.

The load-free driving signal LFDS being in-phase with the touch driving signal TDS means that the phase of the load-free driving signal LFDS is identical to the phase of the touch driving signal TDS.

In addition, the load-free driving signal LFDS may be a signal that is in-phase with the touch driving signal TDS while the amplitude thereof is identical to the amplitude of the touch driving signal TDS.

The load-free driving signal LFDS may be a signal that is completely the same as the touch driving signal TDS or may be any signal that is different from or similar to the touch driving signal TDS, as long as parasitic capacitance between the touch electrode TE and the data line DL can be removed or at least substantially reduced.

The load-free driving signal LFDS may be referred to as being completely the same as the touch driving signal TDS when the frequency, phase, amplitude, and all other characteristics thereof are completely the same.

The load-free driving signal LFDS may be referred to as being substantially the same as the touch driving signal TDS when the frequency, phase, amplitude, and all other characteristics thereof are at least substantially the same. "Substantially the same" may be understood as "within a predeterminable tolerance margin", e.g. within a tolerance margin of ±20%, e.g. within a tolerance margin of ±10%, e.g. within a tolerance margin of ±5%, e.g. within a tolerance margin of ±1%.

Even in the case in which a load-free driving unit (e.g. an integrated driving circuit IDC) outputs a load-free driving signal LFDS completely the same as a touch driving signal TDS, the frequency, phase, voltage (or amplitude), signal waveform (or signal shape) or one or more other characteristics of the load-free driving signal LFDS, actually applied to a data line DL, another touch electrode TE, or the like, may be different from the frequency, phase, voltage (or amplitude), signal waveform (or signal shape) or one or more other characteristics of the touch driving signal TDS, due to panel characteristics, such as a load and an RC delay.

The degree of difference of the output state of the load-free driving signal LFDS from the state at a point in time of actual application may vary, depending on the panel position (i.e. the horizontal or vertical position of the data line DL or the touch electrode TE to which the load-free driving signal is applied). Considering that the output state of the load-free driving signal LFDS differs from the state of actual application as described above, the output state of the touch driving signal TDS or the output state of the load-free driving signal LFDS can be adjusted such that the state of actual application of the load-free driving signal LFDS is the same or at least substantially the same as the state of actual application of the touch driving signal TDS.

Thus, all of the frequency, phase, voltage (or amplitude), signal waveform (or signal shape) or the like of a touch driving signal TDS output by the integrated driving circuit IDC may be the same as those of the load-free driving signal LFDS output by a load-free driving circuit (e.g. a source driving circuit, a touch driving circuit, or an integrated driving circuit), or at least one of the frequency, phase, voltage (or amplitude), signal waveform (or signal shape) or the like of the touch driving signal TDS may be different from one of the corresponding frequency, phase, voltage (or amplitude), signal waveform (or signal shape) or the like of the load-free driving signal LFDS, such that the state of actual application of the load-free driving signal LFDS is the same or at least substantially the same as the state of actual application of the touch driving signal TDS.

Consequently, while a touch driving signal TDS is being applied to a touch electrode TE, a potential difference between a data line DL and the touch electrode TE does not occur or is at least substantially reduced, whereby parasitic capacitance between the data line DL and the touch electrode TE can be eliminated or at least substantially reduced.

Hereinafter, a variety of examples of COF type integrated driving circuits IDC able to remove stubborn noise will be described in more detail.

FIG. 17 to FIG. 22 are schematic views illustrating COF type integrated driving circuits IDC for removing stubborn noise according to exemplary embodiments.

Figure 17:
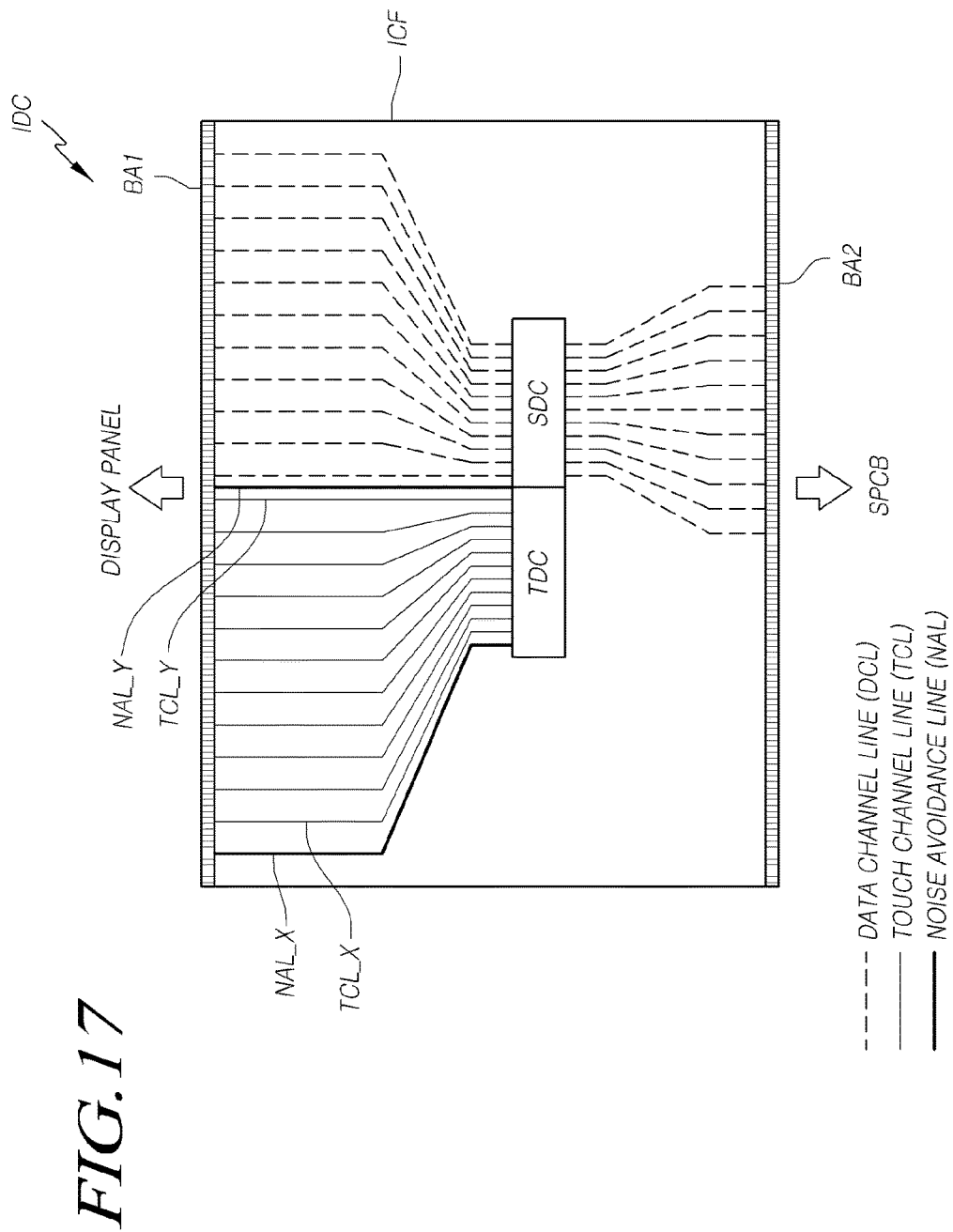
FIG. 17 to FIG. 22 are schematic views illustrating COF type integrated driving circuits for removing stubborn noise according to exemplary embodiments.
Figure 18:
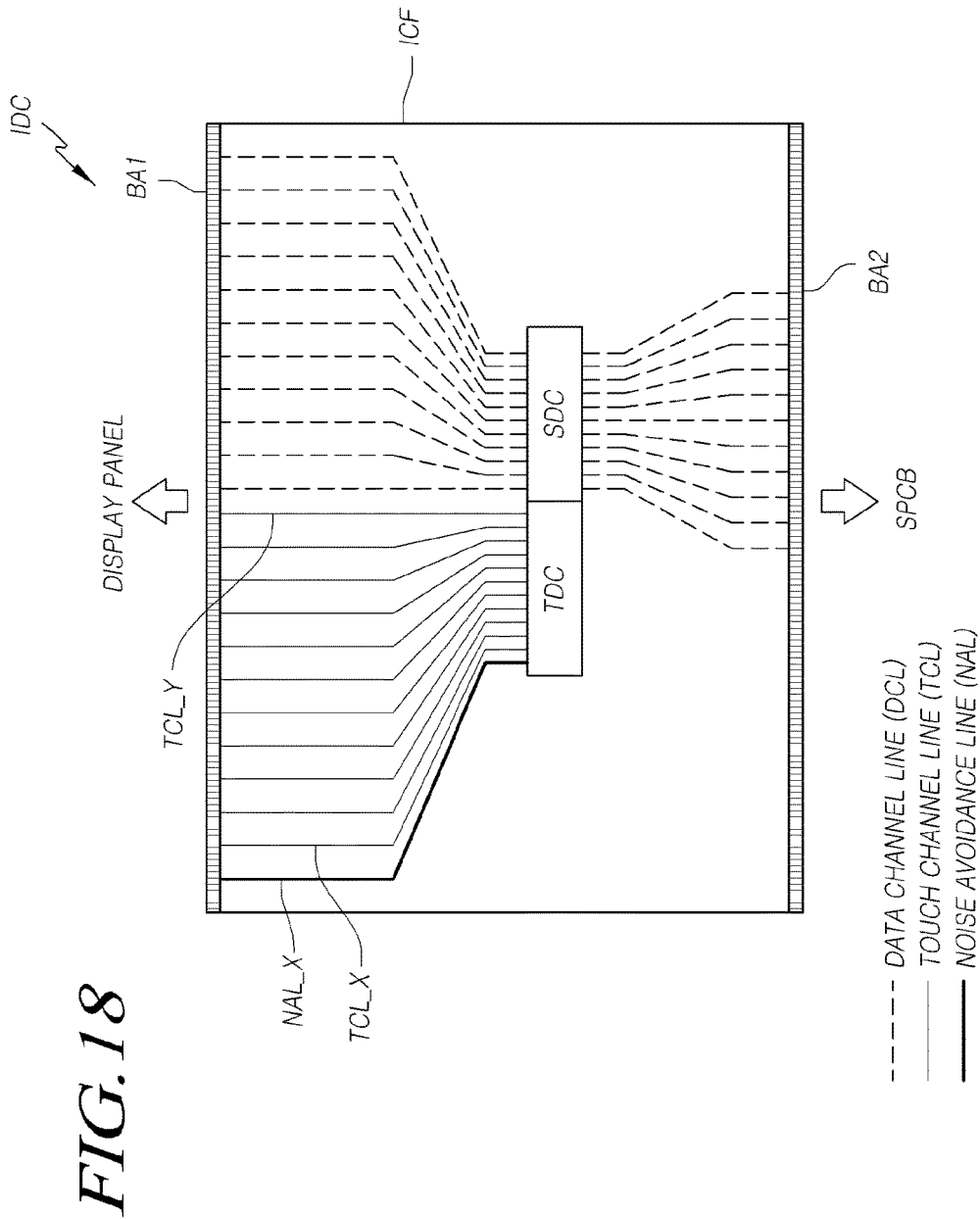

FIG. 17 and FIG. 18 illustrate a case in which an integrated driving circuit IDC includes a single source driving circuit SDC and a single touch driving circuit TDC, while FIG. 19 to FIG. 22 illustrate a case in which an integrated driving circuit IDC includes a single source driving circuit SDC and two touch driving circuits TDC.

Referring to FIG. 17 to FIG. 22, the COF type integrated driving circuits IDC according to exemplary embodiments are driving circuits that provide data driving and touch driving in a combined manner.

Each of the COF type integrated driving circuits IDC according to exemplary embodiments includes an integrated driving chip STIC (see FIG. 6 and FIG. 7) and an integrated circuit (IC) film ICF. The integrated driving chip STIC including at least one source driving circuit SDC and at least one touch driving circuit TDC is mounted on the IC film ICF.

The integrated driving chip STIC may include data channels through which image data voltages are output, touch channels through which touch driving signals are output, a source driving circuit SDC outputting image data voltages through the data channels, and at least one touch driving circuit TDC outputting touch driving signals TDS through the touch channels.

The source driving circuit SDC can output image data voltages through the data channels corresponding to data lines DL.

The touch driving circuit TDC can output touch driving signals TDS through the touch channels corresponding to the touch electrodes TE.

Data channel lines DCL electrically connected to the data channels of the source driving circuit SDC are disposed on the IC film ICF.

In addition, touch channel lines TCL electrically connected to the touch channels of the touch driving circuit TDC are disposed on the IC film ICF.

Referring to FIG. 17 to FIG. 22, at least one noise avoidance line NAL (NAL_X, NAL_Y, NAL_A, NAL_B, NAL_C, NAL_D) is located outward of at least one outermost touch channel line among the touch channel lines TCL (TCL_X, TCL_Y, TCL_A, TCL_B, TCL_C, TCL_D). Herein, an outermost channel line has another touch channel line adjacent to one side of the outermost touch channel line but has no other touch signal line adjacent to another side of the outermost touch channel line.

This feature can consequently provide a COF type integrated driving circuit IDC having a structure capable of removing or reducing stubborn noise and a display device 100 having a built-in touchscreen including the same.

Hereinafter, the arrangement of the noise avoidance line NAL will be described in more detail with reference to FIG. 17 to FIG. 22.

Referring to FIG. 17, touch channel lines TCL electrically connected to touch channels of a single touch driving circuit TDC in a corresponding manner include a first outermost touch channel line TCL_X located in an outermost position in one direction (i.e. in a direction away from a source driving circuit SDC) and a second outermost touch channel line TCL_Y located in an outermost position in the other direction (i.e. in a direction toward the source driving circuit SDC). Illustratively, the first outermost touch channel line TCL_X may be located distant from the source driving circuit SDC, and the second outermost touch channel line TCL_Y may be located proximate the source driving circuit SDC.

A first noise avoidance line NAL_X is located outward of and adjacent to the first outermost touch channel line TCL_X, while a second noise avoidance line NAL_Y is located outward of and adjacent to the second outermost touch channel line TCL_Y. A touch sense signal is not sensed from the noise avoidance lines in the touch mode. The noise avoidance line also does not carry the image data voltages in the display mode.

According to exemplary embodiments, the second noise avoidance line NAL_Y is located outward of and adjacent to the second outermost touch channel line TCL_Y.

In other words, the second noise avoidance line NAL_Y is located between the second outermost touch channel line TCL_Y and the outermost data channel line DCL.

The second noise avoidance line NAL_Y may be electrically connected to the touch driving circuit or the source driving circuit.

When the touch driving circuit is electrically connected to the second noise avoidance line NAL_Y, the touch driving circuit provides the noise avoidance signal to the second noise avoidance line NAL_Y through a noise avoidance channel of the touch driving circuit.

When the source driving circuit is electrically connected to the second noise avoidance line NAL_Y, the source driving circuit provides the noise avoidance signal to the second noise avoidance line NAL_Y through a noise avoidance channel of the source driving circuit.

The noise avoidance channel may be referred to as output nodes (output ports, or output terminals) through which the noise avoidance signal is output.

FIG. 18 illustrates a case in which load-free driving is performed on data lines DL as illustrated in FIG. 16. In this case, load-free driving signals LFDS are applied to data channel lines DCL on an IC film ICF during a touch mode period. The load-free driving signals LFDS are identical to or in-phase with touch driving signals TDS.

In the two outermost touch channel lines TCL_X and TCL_Y, a touch driving signal TDS is applied to a touch channel line TCL adjacent to one side of the second outermost touch channel line TCL_Y located in the outermost position in the other direction, while a load-free driving signal LFDS identical to or in-phase with a touch driving signal TDS is applied to a data channel line DCL located adjacent to the other side of the second outermost touch channel line TCL_Y.

This can consequently reduce or prevent stubborn noise occurring in the second outermost touch channel line TCL_Y located in the outermost position in the other direction.

However, in the two outermost touch channel lines TCL_X and TCL_Y, one side of the first outermost touch channel line TCL_X located in the outermost position in one direction is in an electrically open state, while a touch driving signal TDS is applied to a touch channel line TCL located adjacent to the other side of the first outermost touch channel line TCL_X.

Thus, stubborn noise may occur in the first outermost touch channel line TCL_X located in the outermost position in one direction.

In this regard, as illustrated in FIG. 18, a first noise avoidance line NAL_X may be only disposed outward of the first outermost touch channel line TCL_X located in the outermost position of the two outermost touch channel lines TCL_X and TCL_Y in one direction.

Referring to FIG. 17 and FIG. 18, in the two outermost touch channel lines TCL_X and TCL_Y, the length of the first outermost touch channel line TCL_X located in the outermost position in one direction is longer than the length of the second outermost touch channel line TCL_Y located in the outermost position in the other direction.

Figure 19:
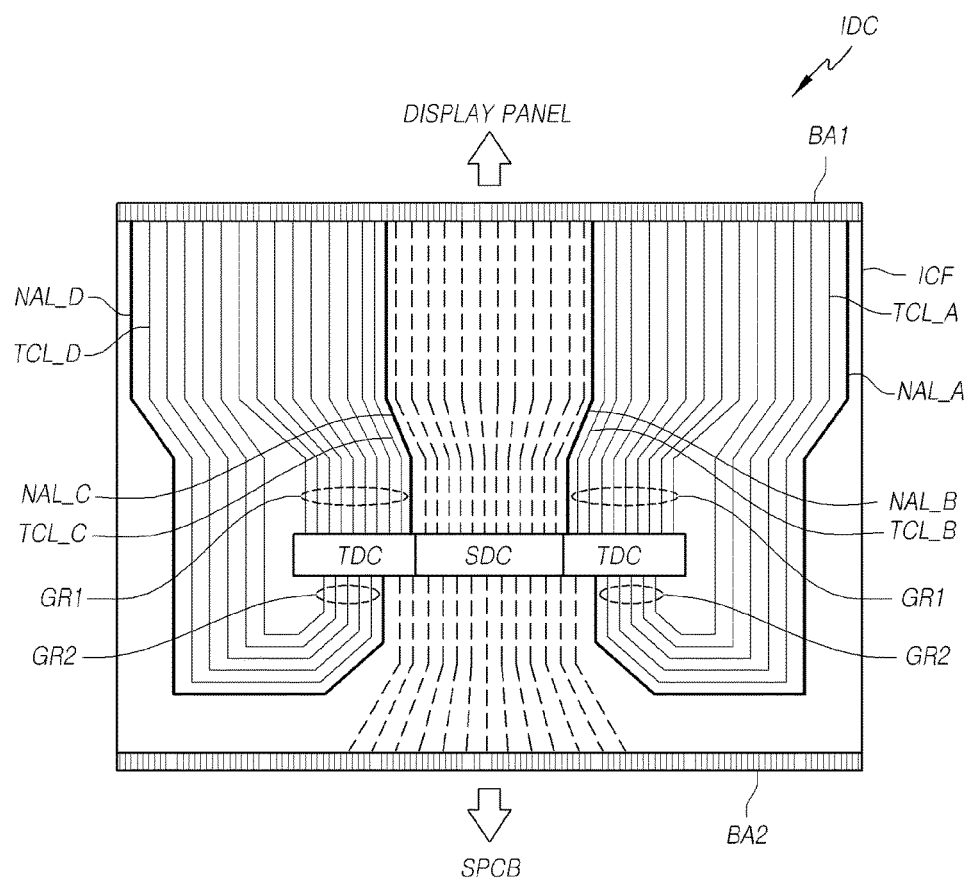

Referring to FIG. 19, touch channel lines TCL are electrically connected to touch channels of one of two touch driving circuits TDC, i.e. the touch driving circuit TDC located in a first direction (to the right in FIG. 19) of a source driving circuit SDC, in a corresponding manner. The touch channel lines TCL include a first outermost touch channel line TCL_A located in an outermost position in one direction (i.e. in a direction away from the source driving circuit SDC) and a second outermost touch channel line TCL_B located in an outermost position in the other direction (i.e. in a direction toward the source driving circuit SDC). Illustratively, the first outermost touch channel line TCL_A may be located distant from the source driving circuit SDC, and the second outermost touch channel line TCL_B may be located proximate the source driving circuit SDC.

In addition, touch channel lines TCL are electrically connected to touch channels of the other one of the two touch driving circuits TDC, i.e. the touch driving circuit TDC located in a second direction (to the left in FIG. 19) of the source driving circuit SDC, in a corresponding manner. The touch channel lines TCL include a first outermost touch channel line TCL_D located in an outermost position in one direction (i.e. in a direction away from the source driving circuit SDC) and a second outermost touch channel line TCL_C located in an outermost position in the other direction (i.e. in a direction toward the source driving circuit SDC). Illustratively, the first outermost touch channel line TCL_D may be located distant from the source driving circuit SDC, and the second outermost touch channel line TCL_C may be located proximate the source driving circuit SDC.

That is, the touch channel lines TCL electrically connected to the touch channels of the touch driving circuits TDC include the first outermost touch channel lines TCL_A and TCL_D located farthest from the source driving circuit SDC and the second outermost touch channel lines TCL_B and TCL_C located closest to the source driving circuit SDC).

Referring to FIG. 19, noise avoidance lines NAL_A, NAL_D, NAL_B, and NAL_C are disposed outward of the first outermost touch channel lines TCL_A and TCL_D and the second outermost touch channel lines TCL_B and TCL_C among the touch channel lines TCL electrically connected to the touch channels of the touch driving circuits TDC in a corresponding manner.

Specifically, the first noise avoidance line NAL_A is disposed outward of the first outermost touch channel line TCL_A among the touch channel lines TCL electrically connected to the touch channels of the one of the two touch driving circuits TDC, i.e. the touch driving circuit TDC located in the first direction (i.e. to the right in FIG. 19) of the source driving circuits SDC, in a corresponding manner, while the second noise avoidance line NAL_B is disposed outward of the second outermost touch channel line TCL_B among the same touch channel lines TCL.

In addition, the first noise avoidance line NAL_D is disposed outward of the first outermost touch channel line TCL_D among the touch channel lines TCL electrically connected to the touch channels of the other one of the two touch driving circuits TDC, i.e. the touch driving circuit TDC located in the second direction (i.e. to the left in FIG. 19) of the source driving circuits SDC, in a corresponding manner, while the second noise avoidance line NAL_C is disposed outward of the second outermost touch channel line TCL_C among the same touch channel lines TCL.

Referring to FIG. 19, in the touch channel lines TCL electrically connected to the touch channels of the touch driving circuits TDC in a corresponding manner, the first outermost touch channel lines TCL_A and TCL_D located farthest from the source driving circuit SDC are longer than the second outermost touch channel lines TCL_B and TCL_C located closest to the source driving circuit SDC.

Thus, the first noise avoidance lines NAL_A and NAL_D located outward of the first outermost touch channel lines TCL_A and TCL_D are longer than the second noise avoidance lines NAL_B and NAL_C located outward of the second outermost touch channel lines TCL_B and TCL_C.

Since the first outermost touch channel lines TCL_A and TCL_D are longer than the second outermost touch channel lines TCL_B and TCL_C as described above, the level of stubborn noise occurring in touch electrodes TE_A and TE_D electrically connected to the first outermost touch channel lines TCL_A and TCL_D may be higher than the level of stubborn noise occurring in touch electrodes TE_B and TE_C electrically connected to the second outermost touch channel lines TCL_B and TCL_C.

In this regard, the noise avoidance lines NAL_A and NAL_D may only be disposed outward of the first outermost touch channel line TCL_A and TCL_D. In other words, only the first noise avoidance lines NAL_A and NAL_D may be provided.

Figure 20:
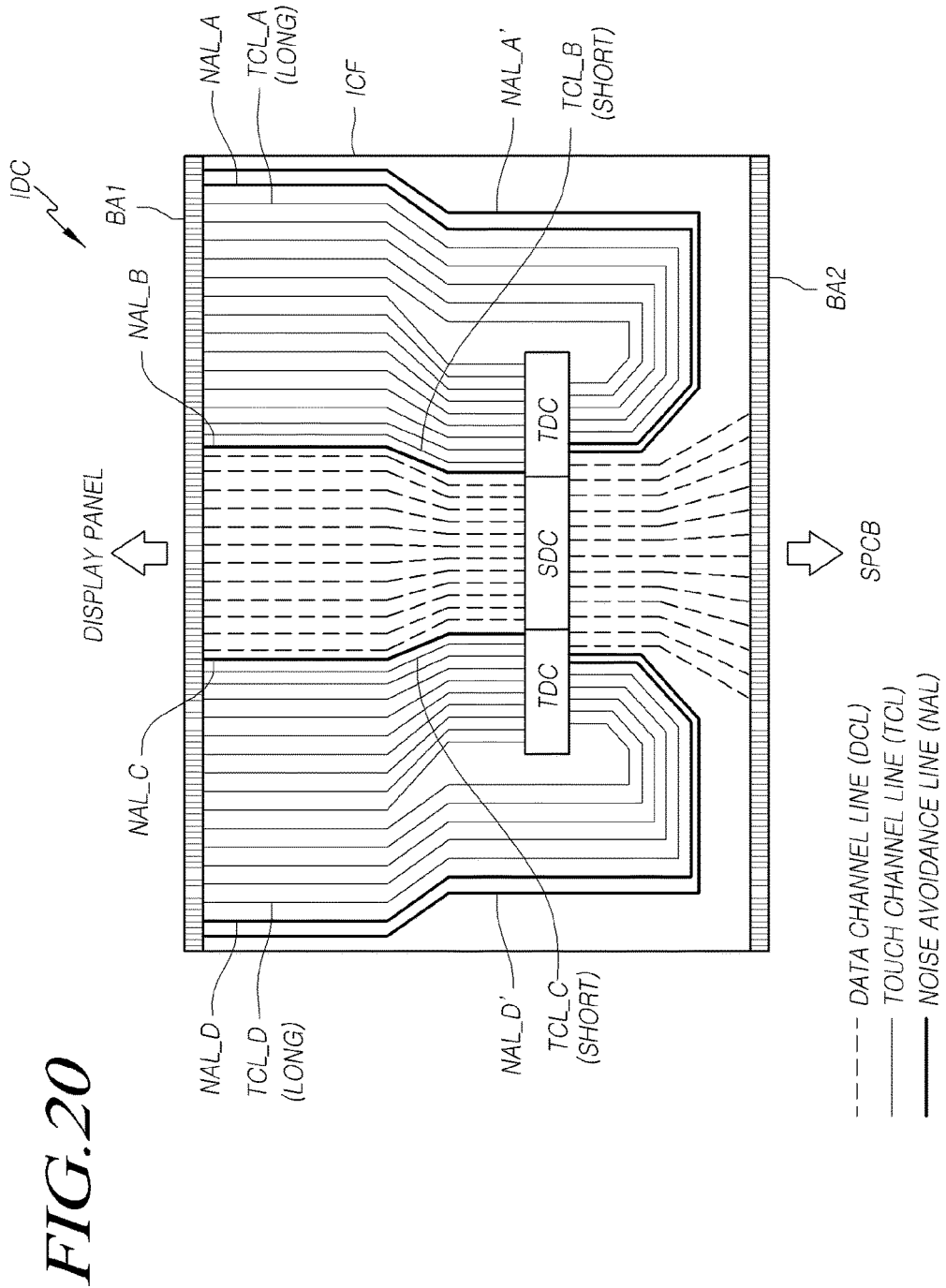

In some cases, in addition to the first noise avoidance lines NAL_A and NAL_D disposed outward of the first outermost touch channel lines TCL_A and TCL_D and the second noise avoidance lines NAL_B and NAL_C disposed outward of the second outermost touch channel lines TCL_B and TCL_C, at least one additional noise avoidance line NAL_A' may be disposed outward of the first noise avoidance line NAL_A, while at least one additional noise avoidance line NAL_D' may be disposed outward of first noise avoidance line NAL_D', as illustrated in FIG. 20. For example, the at least one additional noise avoidance line NAL_A' may be disposed outward of the first noise avoidance line NAL_A and the at least one additional noise avoidance line NAL_D' may be disposed outward of the first noise avoidance line NAL_D, as shown in FIG. 20. In other words, the first noise avoidance line NAL_A may be disposed between the first outermost touch channel line TCL_A and the at least one additional noise avoidance line NAL_A', and the first noise avoidance line NAL_D may be disposed between the first outermost touch channel line TCL_D and the at least one additional noise avoidance line NAL_D'.

Figure 21:
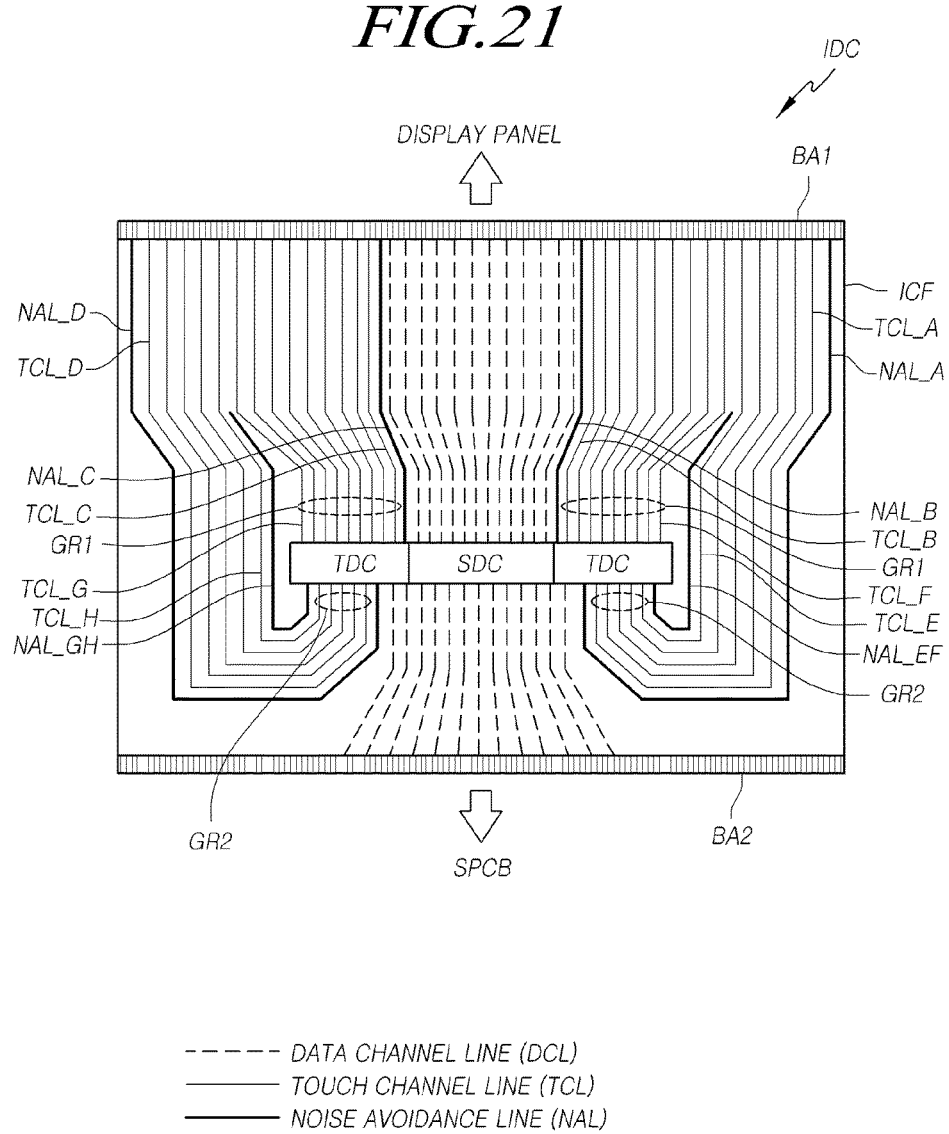

Referring to FIG. 21, the touch channel lines TCL are divided into a first group GR1 and a second group GR2.

Referring to FIG. 21, a relatively large space is present between the first group GR1 and the second group GR2. Thus, the space between the first group GR1 and the second group GR2 may form a voltage open state, thereby increasing the possibility of stubborn noise.

In the two touch driving circuits TDC, regarding the touch driving circuit TDC located in the first direction (to the right in FIG. 21) of the source driving circuit SDC, the distance between a touch channel line TCL_F among the touch channel lines TCL of the first group GR1, closest to the second group GR2, and a touch channel line TCL_E among the touch channel lines TCL of the second group GR2, closest to the first group GR1, is wider than the distance between any adjacent touch channel lines belonging to the same group.

Thus, as illustrated in FIG. 21, an additional noise avoidance line NAL_EF can be further disposed between the touch channel line TCL_F among the touch channel lines TCL of the first group GR1, closest to the second group GR2, and the touch channel line TCL_E among the touch channel lines TCL of the second group GR2, closest to the first group GR1.

In addition, in the two touch driving circuits TDC, regarding the touch driving circuit TDC located in the second direction (to the left in FIG. 21) of the source driving circuit SDC, the distance between a touch channel line TCL_G among the touch channel lines TCL of the first group GR1, closest to the second group GR2, and a touch channel line TCL_H among the touch channel lines TCL of the second group GR2, closest to the first group GR1, is wider than the distance between any adjacent touch channel lines belonging to the same group.

Thus, as illustrated in FIG. 21, an additional noise avoidance line NAL_GH can be further disposed between the touch channel line TCL_G among the touch channel lines TCL of the first group GR1, closest to the second group GR2, and the touch channel line TCL_H among the touch channel lines TCL of the second group GR2, closest to the first group GR1.

Figure 22:
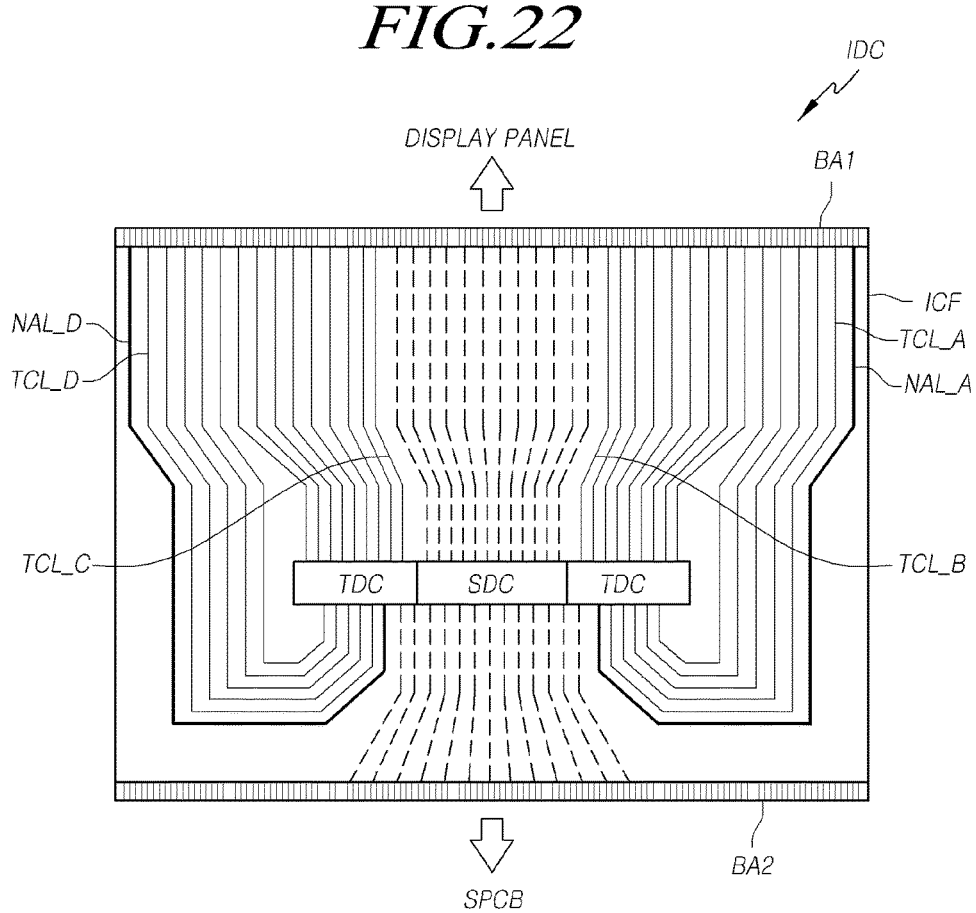

FIG. 22 illustrates an arrangement of noise avoidance lines when performing load-free driving on data lines DL, i.e. when load-free driving signals LFDS identical to or in-phase with touch driving signals TDS are applied to data channel lines DCL during a touch mode period.

Referring to FIG. 22, when load-free driving is performed on the data lines DL, no stubborn noise or a low level of noise may occur in relation to the second outermost touch channel lines TCL_B and TCL_C.

Thus, unlike the configuration illustrated in FIG. 19, the second noise avoidance lines NAL_B and NAL_C need not be disposed outward of the second outermost touch channel lines TCL_B and TCL_C. In other words, only the first noise avoidance lines NAL_A and NAL_D may be provided.

Hereinafter, several characteristics of the arrangement of noise avoidance lines described above with reference to FIG. 17 to FIG. 22 will be summarized briefly.

As illustrated in FIG. 17 and FIG. 19 to FIG. 21, regarding the first outermost touch channel line TCL_X or the first outermost touch channel lines TCL_A and TCL_D and the second outermost touch channel line TCL_Y or the second outermost touch channel lines TCL_B and TCL_C among the touch channel lines TCL connected to the touch channels of the touch driving circuit(s) TDC, at least one noise avoidance line NAL_X or NAL_A and NAL_D is located outward of the first outermost touch channel line(s) TCL, while at least one noise avoidance line NAL_Y or NAL_B and NAL_C is located outward of the second outermost touch channel line(s) TCL.

Since the noise avoidance lines are disposed outward of the two outermost touch channel lines among the touch channel lines TCL connected to the touch channels of the touch driving circuit(s) TDC as described above, stubborn noise can be reduced or prevented, whereby the accuracy of touch sensing can be improved.

As illustrated in FIG. 18 and FIG. 22, in the first outermost touch channel line TCL_X or the first outermost touch channel lines TCL_A and TCL_D and the second outermost touch channel line TCL_Y or the second outermost touch channel lines TCL_B and TCL_C among the touch channel lines TCL connected to the touch channels of the touch driving circuit(s) TDC, at least one noise avoidance line NAL_X, or NAL_A and NAL_D, is only located outward of the first outermost touch channel line(s) TCL_X, or TCL_A and TCL_D, respectively.

Since the noise avoidance line is only disposed outward of one of the two outermost touch channel lines among the touch channel lines TCL connected to the touch channels of the touch driving circuit(s) TDC as described above, stubborn noise can be effectively reduced or prevented, and the wiring structure of the IC film ICF can be designed to be simple.

In this case, during a touch mode period, a load-free driving signal(s) LFDS identical to or in-phase with a touch driving signal(s) TDS is applied to at least one data channel line DCL adjacent to the second outermost touch channel line(s) TCL_Y or TCL_B and TCL_C.

As illustrated in FIG. 21, the noise avoidance line NAL_EF or NAL_GH is further disposed in the space between the first group GR1 and the second group GR2.

Since the noise avoidance line NAL_EF or NAL_GH is further disposed in the space between the first group GR1 and the second group GR2 as described above, it is possible to remove or reduce stubborn noise that would otherwise occur in the case that the space between the first group GR1 and the second group GR2 was relatively wide.

As described in FIG. 20, the number of the noise avoidance lines NAL disposed outward of the first outermost touch channel lines TCL may be greater than the number of noise avoidance lines NAL disposed outward of the second outermost touch channel lines TCL.

As described above, it is possible to effectively reduce or prevent stubborn noise that would be more significant in the case that the outermost touch channel lines were longer.

Here, each of the first outermost touch channel lines TCL_X, TCL_A, and TCL_D corresponds to the touch channel line farthest from the source driving circuit SDC among the touch channel lines TCL electrically connected to the touch channels of the touch driving circuit TDC in a corresponding manner.

Each of the second outermost touch channel lines TCL_Y, TCL_B, and TCL_C corresponds to the touch channel line closest to the source driving circuit SDC among the touch channel lines TCL electrically connected to the touch channels of the touch driving circuit TDC in a corresponding manner.

Figure 23:
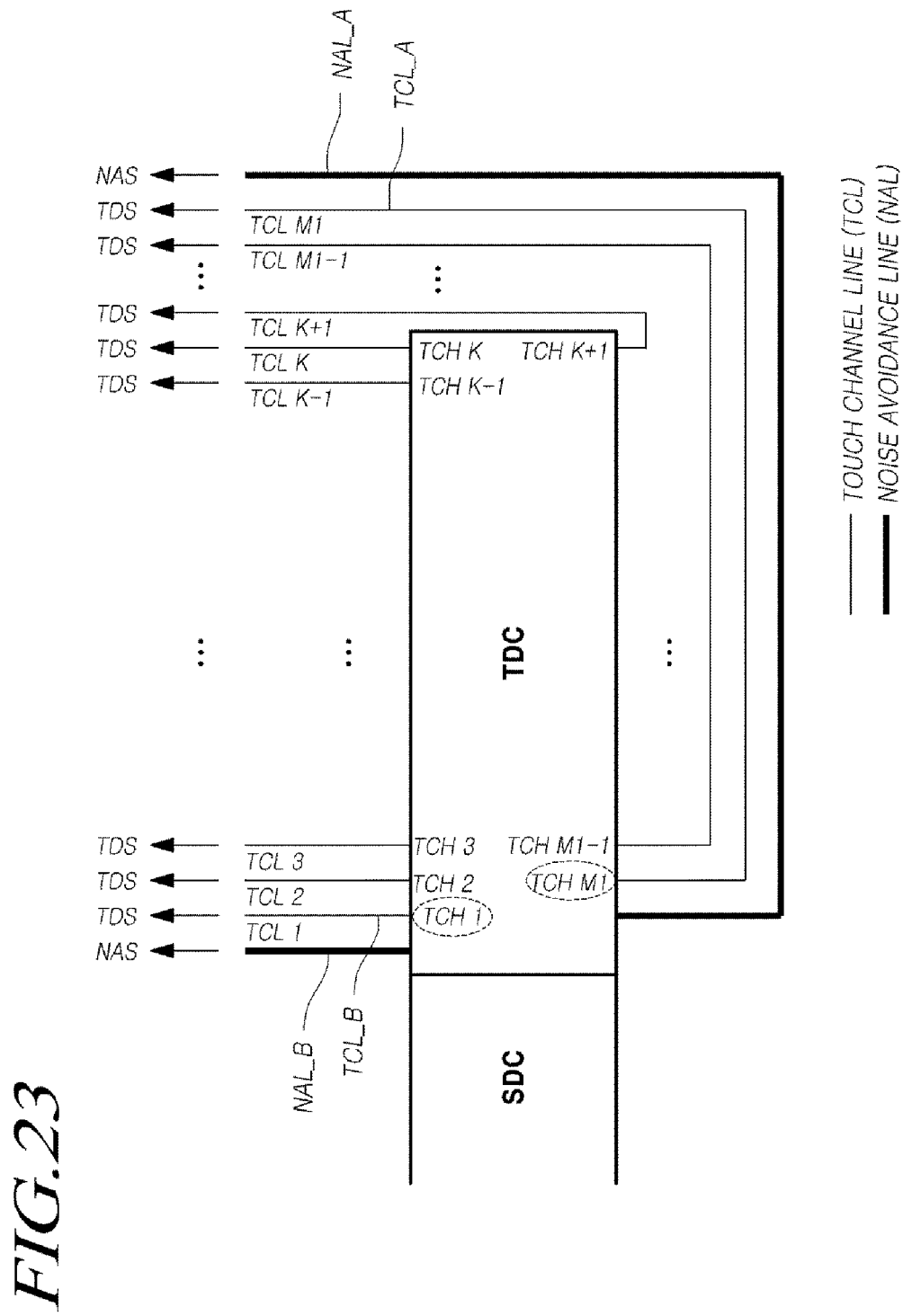
FIG. 23 is a schematic view illustrating signals output by a touch driving circuit within a COF type integrated driving circuit for removing stubborn noise according to exemplary embodiments.

FIG. 23 is a schematic view illustrating signals output by a touch driving circuit TDC within a COF type integrated driving circuit IDC for removing stubborn noise according to exemplary embodiments. Here, FIG. 23 illustrates the touch driving circuit TDC located in one direction, in other words, at one side, (i.e. to the right) of the source driving circuit SDC in FIG. 19 and a portion of the IC film ICF around the same touch driving circuit TDC.

Referring to FIG. 23, the touch driving circuit TDC has M1 touch channels TCH 1, . . . , TCH M1 (where M1 is a natural number equal to or greater than 2).

The M1 touch channels TCH 1 to TCH M1 are connected to M1 touch channel lines TCL 1, . . . , and TCL M1 on the IC film ICF in a corresponding manner.

The touch channel line TCL M1 and the touch channel line TCL 1 among the M1 touch channel lines TCL 1 to TCL M1 correspond to the first outermost touch channel line TCL_A and the second outermost touch channel line TCL_B, respectively.

In a touch mode period, when touch driving signals TDS are applied to the outermost touch channel lines TCL_A and TCL_B, noise avoidance signals NAS corresponding to the touch driving signals TDS can be applied to the noise avoidance lines NAL_A and NAL_B.

As described above, when the touch driving signals TDS are applied to the outermost touch channel lines TCL_A and TCL_B, the noise avoidance signals NAS are additionally applied to the noise avoidance lines NAL_A and NAL_B additionally disposed outward of the outermost touch channel lines TCL_A and TCL_B. The touch driving signals TDS and the corresponding noise avoidance signals NAS are applied to the lines adjacent to both sides of the outermost touch channel lines TCL_A and TCL_B. Consequently, stubborn noise related to the outermost touch channel lines TCL_A and TCL_B can be reduced or prevented.

The noise avoidance signals NAS may be completely identical to the touch driving signals TDS or may be signals different from or similar to the touch driving signals TDS.

Such a noise avoidance signal NAS may be referred to as being completely the same as a touch driving signal TDS when the frequency, phase, amplitude, and all other characteristics thereof are completely the same. In addition, the noise avoidance signal NAS may be referred to as being substantially the same as a touch driving signal TDS when the frequency, phase, amplitude, and other characteristics thereof are at least substantially the same. "Substantially the same" may be understood as "within a predeterminable tolerance margin", e.g. within a tolerance margin of ±20%, e.g. within a tolerance margin of ±10%, e.g. within a tolerance margin of ±5%, e.g. within a tolerance margin of ±1%.

Even in the case in which an integrated driving circuit IDC outputs a noise avoidance signal NAS completely the same as a touch driving signal TDS, the frequency, phase, voltage (or amplitude), signal waveform (or signal shape) or one or more other characteristics of the noise avoidance signal NAS actually applied to the noise avoidance lines may be slightly different from the frequency, phase, voltage (or amplitude), signal waveform (or signal shape) or one or more other characteristics of the touch driving signal TDS, due to electrical characteristics of the IC film ICF.

The degree of difference of the output state (e.g. phase, amplitude, or frequency) of the noise avoidance signal NAS from the signal state (e.g. phase, amplitude, or frequency) on the IC film ICF may vary depending on the position of the noise avoidance line NAL on the IC film ICF.

Considering these factors, the output state of the touch driving signal TDS or the noise avoidance signal NAS can be adjusted such that the state (e.g. phase, amplitude, or frequency) of the noise avoidance signal NAS when applied on the IC film ICF is identical or at least substantially identical to the state (e.g. phase, amplitude, or frequency) of the touch driving signal TDS when applied on the IC film ICF. The output state of the touch driving signal TDS or the noise avoidance signal NAS can also be adjusted considering noise removal ability such that the state (e.g. phase, amplitude, or frequency) of the noise avoidance signal NAS when applied on the IC film ICF is caused to be different from the state (e.g. phase, amplitude, or frequency) of the touch driving signal TDS when applied on the IC film ICF.

Thus, all of the frequency, phase, voltage (or amplitude), signal waveform (or signal shape) and other characteristics of the touch driving signal TDS output by the integrated driving circuit IDC may be the same as those of the noise avoidance signal NAS output, or at least one of the frequency, phase, voltage (or amplitude), signal waveform (or signal shape) and other characteristics of the touch driving signal TDS may be different from one of the corresponding frequency, phase, voltage (or amplitude), signal waveform (or signal shape) and other characteristics of the noise avoidance signal NAS, such that the state (e.g. phase, amplitude, or frequency) of the noise avoidance signal NAS on the IC film ICF is identical or at least substantially identical to the state (e.g. phase, amplitude, or frequency) of the touch driving signal TDS on the IC film ICF.

The touch electrodes TE may be common electrodes to which touch driving signals TDS are applied during a touch mode period and common voltages countering pixel voltages are applied to enable display driving in a display mode period.

In this case, during the display mode period, common voltages can be applied to the noise avoidance lines NAL.

The distance between the outermost touch channel line and the noise avoidance line NAL may differ from the distance between two adjacent touch channel lines TCL.

For example, the distance between the outermost touch channel line and the noise avoidance line NAL may be shorter than the distance between two adjacent touch channel lines TCL.

The thickness of the noise avoidance line NAL may differ from the thickness of the touch channel line. The term "thickness" used herein may be identical to the diameter, width, or area of the line, and may correspond to the area of the opposing surfaces of two adjacent lines.

For example, the thickness of the noise avoidance line NAL may be greater than the thickness of the touch channel line.

The effects of the distance between the outermost touch channel line and the adjacent noise avoidance line NAL being narrower than the distance between two adjacent touch channel lines TCL or the effects of the thickness of the noise avoidance line NAL being greater than the thickness of each touch channel line are identical or similar to the effects of the use of two or more noise avoidance lines, e.g. NAL_A and NAL_A', as illustrated in FIG. 20, i.e., it may be more effective for removal or reduction of stubborn noise on the outermost touch channel lines.

Figure 24:
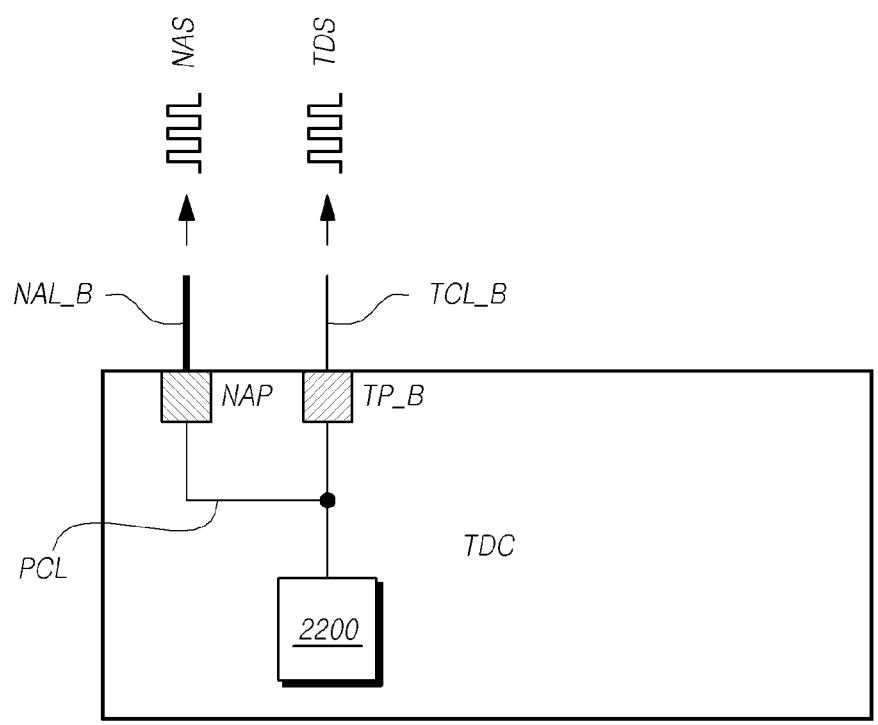
FIG. 24 to FIG. 26 illustrate structures generating noise avoidance signals to remove or reduce stubborn noise in the COF type integrated driving circuit IDC according to exemplary embodiments.
Figure 25:
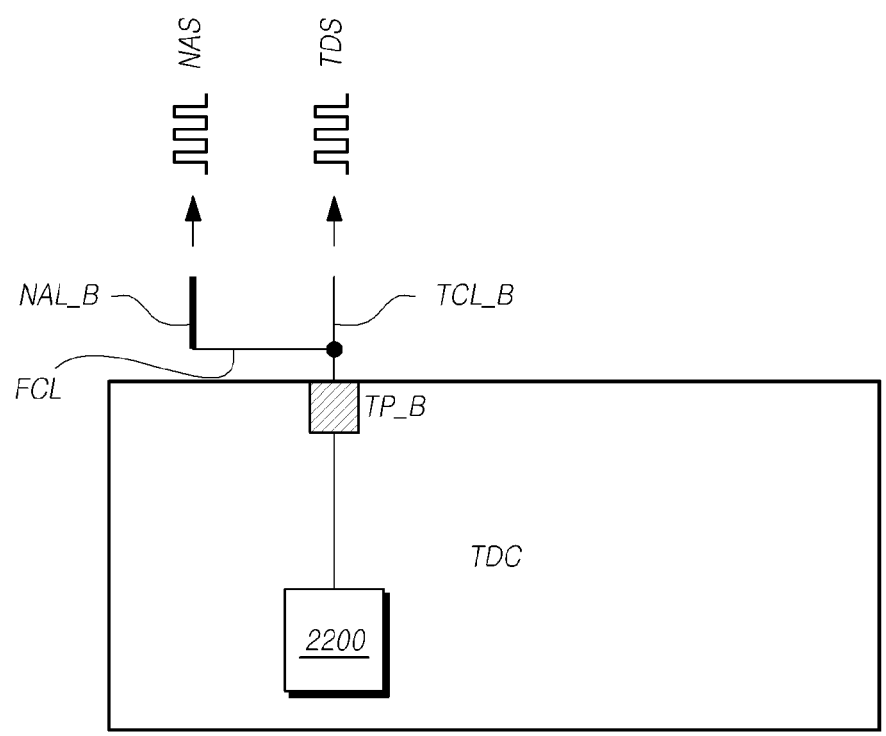
Figure 26:
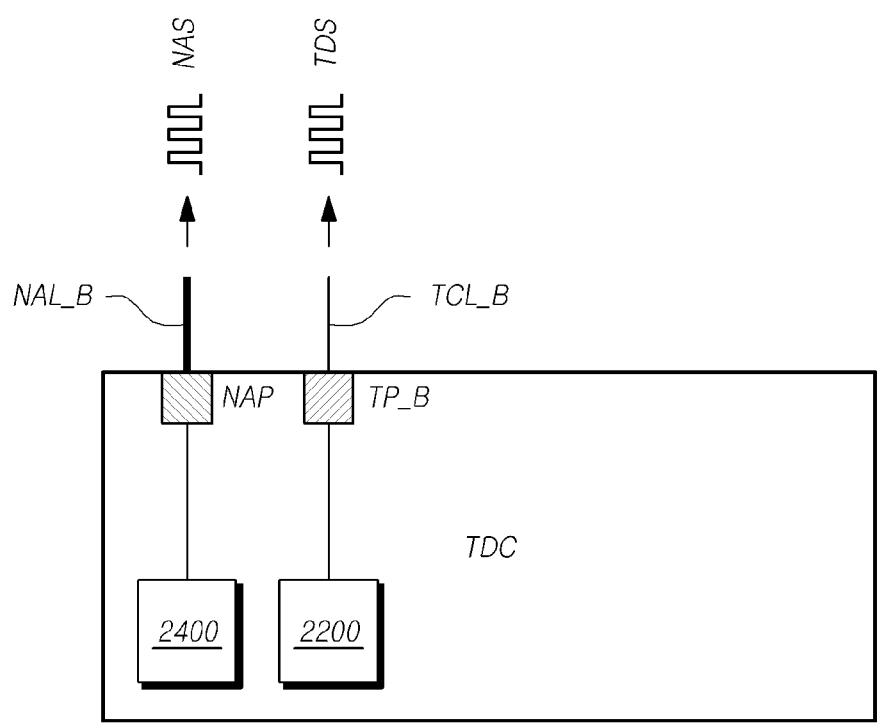

FIG. 24 to FIG. 26 illustrate structures for generating noise avoidance signals NAS to remove or reduce stubborn noise in the COF type integrated driving circuit IDC according to exemplary embodiments.

Referring to FIG. 24, a touch driving circuit TDC has touch pads connected to touch channel lines TCL in a corresponding manner.

The touch driving circuit TDC includes a touch driving signal output circuit 2200 outputting touch driving signals TDS to the touch channel lines TCL through the touch pads.

The touch driving signal output circuit 2200 can output touch driving signals TDS received from the touch driving signal generating circuit TSG.

The touch driving signal output circuit 2200 may be a multiplexer MUX as illustrated in FIG. 5.

In some cases, the touch driving signal output circuit 2200 may be the touch driving signal generating circuit TSG.

The touch pads include an outermost touch pad TP_B connected to an outermost touch channel line TCL_B.

The touch driving circuit TDC further includes a noise avoidance line pad NAP and a connecting line PCL. The noise avoidance line pad NAP is located adjacent to the outermost touch pad TP_B and is connected to the noise avoidance line NAL_B. The connecting line PCL electrically connects the outermost touch pad TP_B and the noise avoidance line pad NAP.

According to the above-described configuration, a noise avoidance signal NAS can be generated within the touch driving circuit TDC, i.e. an integrated driving chip STIC, using a touch driving signal TDS, output by the touch driving signal output circuit 2200, as it is, thereby enabling the noise avoidance signal NAS to be generated in a simple manner. Thus, the same signals flow through the outermost touch channel line TCL_B and the adjacent noise avoidance line NAL_B, whereby stubborn noise can be completely removed or reduced. In addition, there is the advantage of being able to easily generate a noise avoidance signal NAS by simply connecting the two pads TP_B and NAP without a significant change in the touch driving circuit TDC.

Referring to FIG. 25, a connecting line FCL is disposed in an IC film ICF. The connecting line FCL electrically connects the outermost touch channel line TCL_B connected to the outermost touch pad TP_B and the noise avoidance line NAL_B on the IC film ICF.

The configuration as described above makes it possible to generate a noise avoidance signal NAS on an IC film ICF using a touch driving signal TDS, output by a touch driving signal output circuit 2200, as it is, whereby the noise avoidance signal NAS can be generated in a simple manner. Thus, the same signals flow through the outermost touch channel line TCL_B and the adjacent noise avoidance line NAL_B, whereby stubborn noise can be completely removed or reduced. In addition, there is the advantage of being able to easily generate a noise avoidance signal NAS by only adding the connecting line FCL to the IC film ICF without a significant change in the touch driving circuit TDC.

Referring to FIG. 26, the touch driving circuit TDC includes an outermost touch pad TP_B connected to an outermost touch channel line TCL_B, a noise avoidance line pad NAP located adjacent to the outermost touch pad TP_B and connected to a noise avoidance line NAL_B, a touch driving signal output circuit 2200 outputting a touch driving signal TDS through the outermost touch pad TP_B, and a noise avoidance signal output circuit 2400 outputting a noise avoidance signal NAS through the noise avoidance line pad NAP.

The noise avoidance signal output circuit 2400 can output a noise avoidance signal NAS by generating the noise avoidance signal NAS by itself or receiving the noise avoidance signal NAS from a separate noise avoidance signal generating circuit (not shown).

Alternatively, the noise avoidance signal output circuit 2400 can receive a touch driving signal TDS from a touch driving signal generating circuit TSG as well as the touch driving signal output circuit 2200 and output the received touch driving signal TDS as a noise avoidance signal NAS.

According to the above-described configuration, a noise avoidance signal NAS can be generated independently of a touch driving signal TDS. Thus, there is the advantage of being able to easily control the signal characteristics of the noise avoidance signal NAS.

Figure 27:
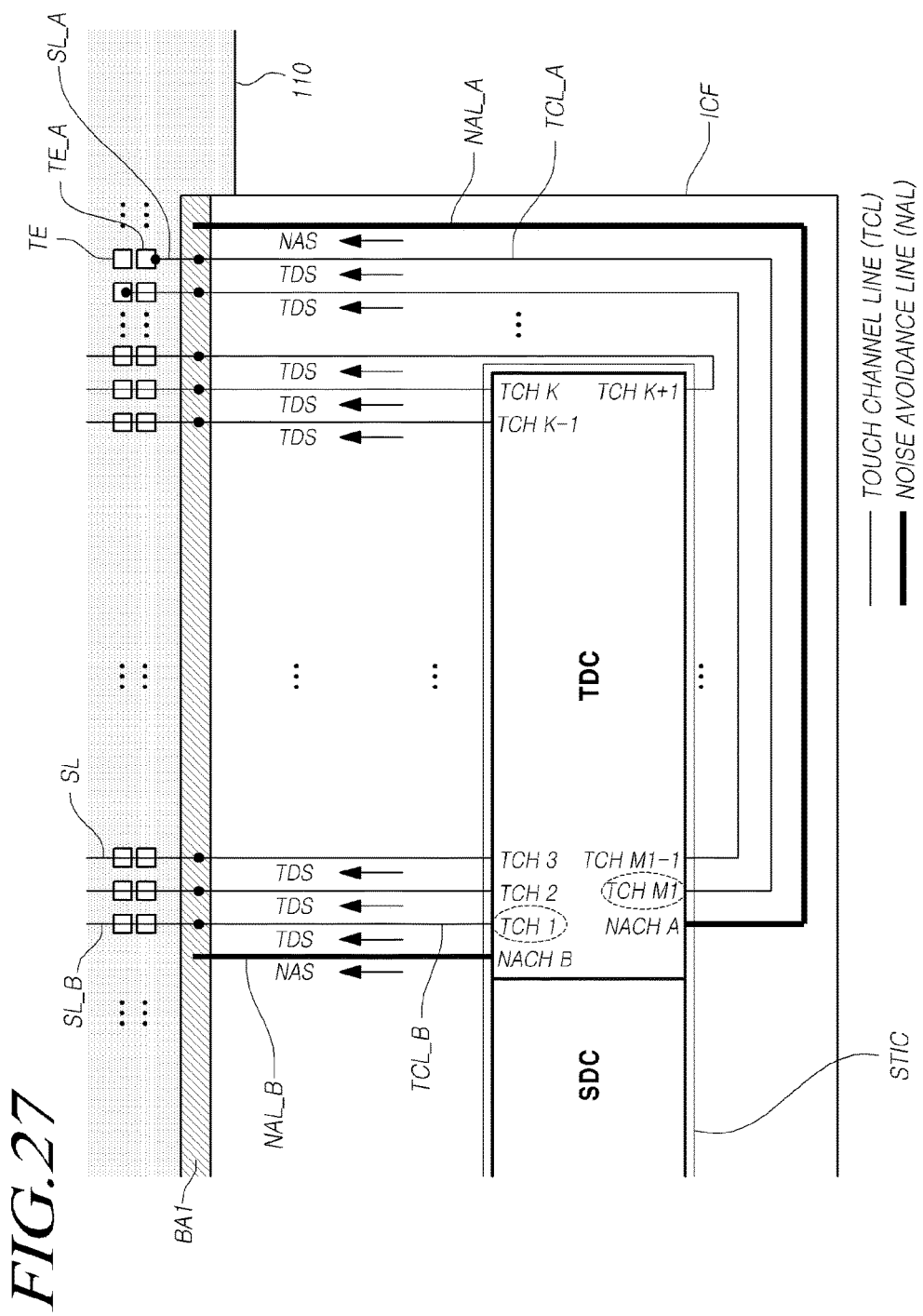
FIG. 27 is a schematic view illustrating a connection structure of the COF type integrated driving circuit according to exemplary embodiments, the connection structure connecting touch channel lines and noise avoidance lines to the display panel.

FIG. 27 is a schematic view illustrating a connection structure of the COF type integrated driving circuit IDC according to exemplary embodiments, the connection structure connecting touch channel lines TCL and noise avoidance lines NAL to the display panel 110.

Referring to FIG. 27, when noise avoidance signals NAS are generated using the pad connection structure as illustrated in FIG. 24, the integrated driving chip STIC further includes noise avoidance channels NACH_A and NACH_B electrically connected to noise avoidance lines NAL_A and NAL_B.

Each of the noise avoidance channels NACH_A and NACH_B is electrically connected to at least one touch channel among touch channels TCH 1, . . . , TCH M1. For example, noise avoidance channel NACH_A may be electrically connected to touch channel TCH M1, which may be disposed adjacent to noise avoidance channel NACH_A, and noise avoidance channel NACH_B may be electrically connected to touch channel TCH 1, which may be disposed adjacent to noise avoidance channel NACH_B.

Noise avoidance signals NAS output through the noise avoidance channels NACH may be in phase with touch driving signals TDS output through the touch channels TCH 1 to TCH M1.

The amplitudes of the noise avoidance signals NAS may be identical to the amplitudes of the touch driving signals TDS.

The amplitudes of the noise avoidance signals NAS may be greater than the amplitudes of the touch driving signals TDS depending on the arrangement of the lines on the IC film ICF, so that noise can be more effectively removed.

As described above, the integrated driving chip STIC capable of effectively preventing stubborn noise that would otherwise occur in the outermost touch channels TCH 1 and TCH M1 can be provided.

Referring to FIG. 27, the touch channel lines TCL are electrically connected to the display panel 110.

In contrast, the noise avoidance lines NAL may not be connected to the display panel 110.

Thus, the noise avoidance signals NAS applied to the noise avoidance lines NAL may be signals that cannot be observed on the display panel 110.

As described above, it is possible to remove or reduce stubborn noise without changing the design of the display panel 110 while minimizing the influence (i.e. unpredictable side effect) of noise avoidance signals on the display panel 110.

The touch channel lines TCL are electrically connected to the touch electrodes TE disposed on the display panel 110, while the noise avoidance lines NAL may not be electrically connected to the touch electrodes TE disposed on the display panel 110.

The noise avoidance lines NAL may not be electrically connected to the display panel 110, or the noise avoidance lines NAL may be electrically connected to the display panel 110 but may not be electrically connected to the touch electrodes TE within the display panel 110.

As described above, a slight change in the design of the display panel 110 may be required to remove stubborn noise, but the possibility of stubborn noise occurring within the display panel 110 can be reduced.

Figure 28:
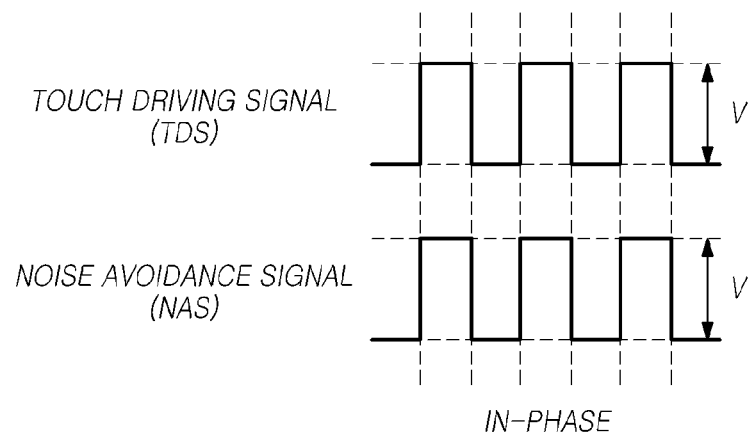
FIG. 28 is a schematic view illustrating the relationship between a noise avoidance signal for removing stubborn noise and a touch driving signal in the COF type integrated driving circuit according to exemplary embodiments.

FIG. 28 is a schematic view illustrating the relationship between a noise avoidance signal NAS for removing stubborn noise and a touch driving signal TDS in the COF type integrated driving circuit IDC according to exemplary embodiments.

Referring to FIG. 28, the noise avoidance signal NAS may be a signal identical to or in phase with the touch driving signal TDS.

In addition, the noise avoidance signal NAS may be a signal in phase with the touch driving signal TDS, while the amplitude thereof is identical or similar to the amplitude of the touch driving signal TDS.

Thus, a touch driving signal TDS and a corresponding noise avoidance signal NAS are present on both sides of an outermost touch channel line even in the case in which a touch channel line is only located on one side of the outermost touch channel line, whereby stubborn noise related to the outermost touch channel line can be removed.

Figure 29:
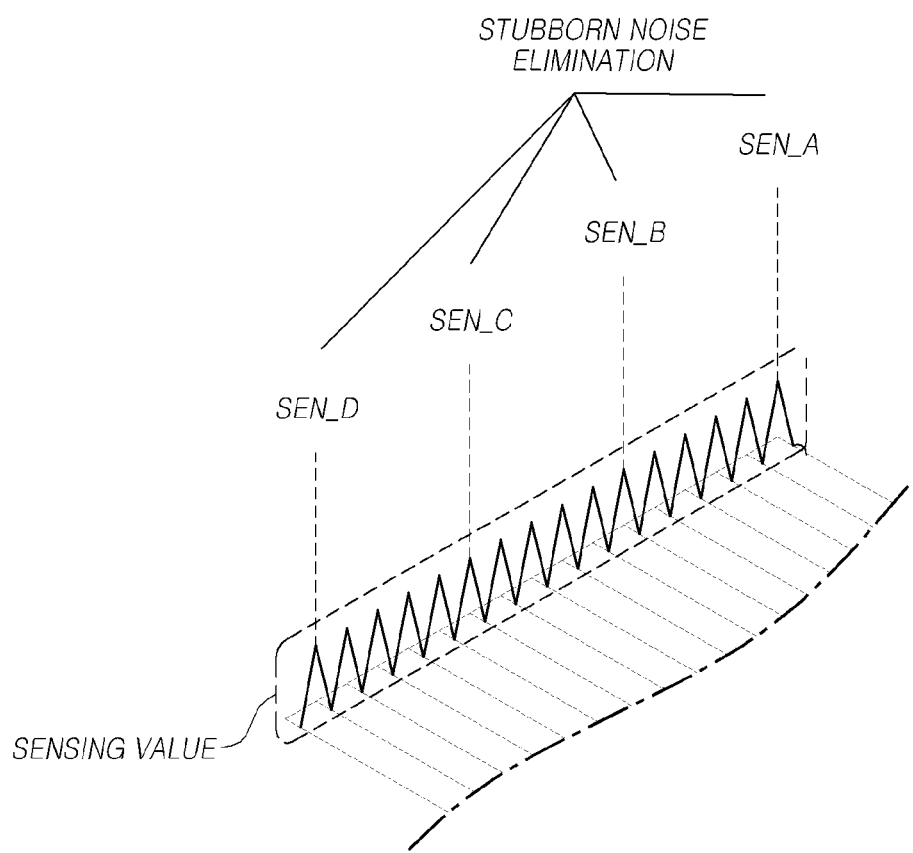
FIG. 29 is a schematic view illustrating sensing values obtained using the COF type integrated driving circuit according to exemplary embodiments, from which stubborn noise is removed.

Referring to FIG. 29, unlike from FIG. 14, sensing values SEN_A, SEN_B, SEN_C, and SEN_D obtained using touch electrodes TE_A, TE_B, TE_C, and TE_D, electrically connected to outermost touch channel line TCL_A, TCL_B, TCL_C, and TCL_D and located at points A, B, C, and D, are not significantly different from the other sensing values.

This means that stubborn noise related to the outermost touch channel lines is removed and errors in detection of a touched position can be prevented.

Hereinabove, the noise avoidance lines NAL in the COF type integrated driving circuit IDC, in which a source driving circuit SDC and at least one touch driving circuit TDC are integrated, and the method of driving the same have been described.

The foregoing exemplary embodiments can also be applied to a COF type driving circuit including at least one touch driving circuit TDC that is not integrated with a source driving circuit SDC.

Describing briefly, the exemplary embodiments can provide the COF type driving circuit including the at least one touch driving circuit TDC outputting touch driving signals through a number of touch channels and a circuit film on which the at least one touch driving circuit TDC is mounted.

Touch channel lines electrically connected to the touch channels of the touch driving circuit(s) may be disposed on the circuit film of the COF type driving circuit.

In addition, a noise avoidance line may be disposed outward of at least one outermost touch channel line of the touch channel lines on the circuit film of the COF type driving circuit.

Figure 30:
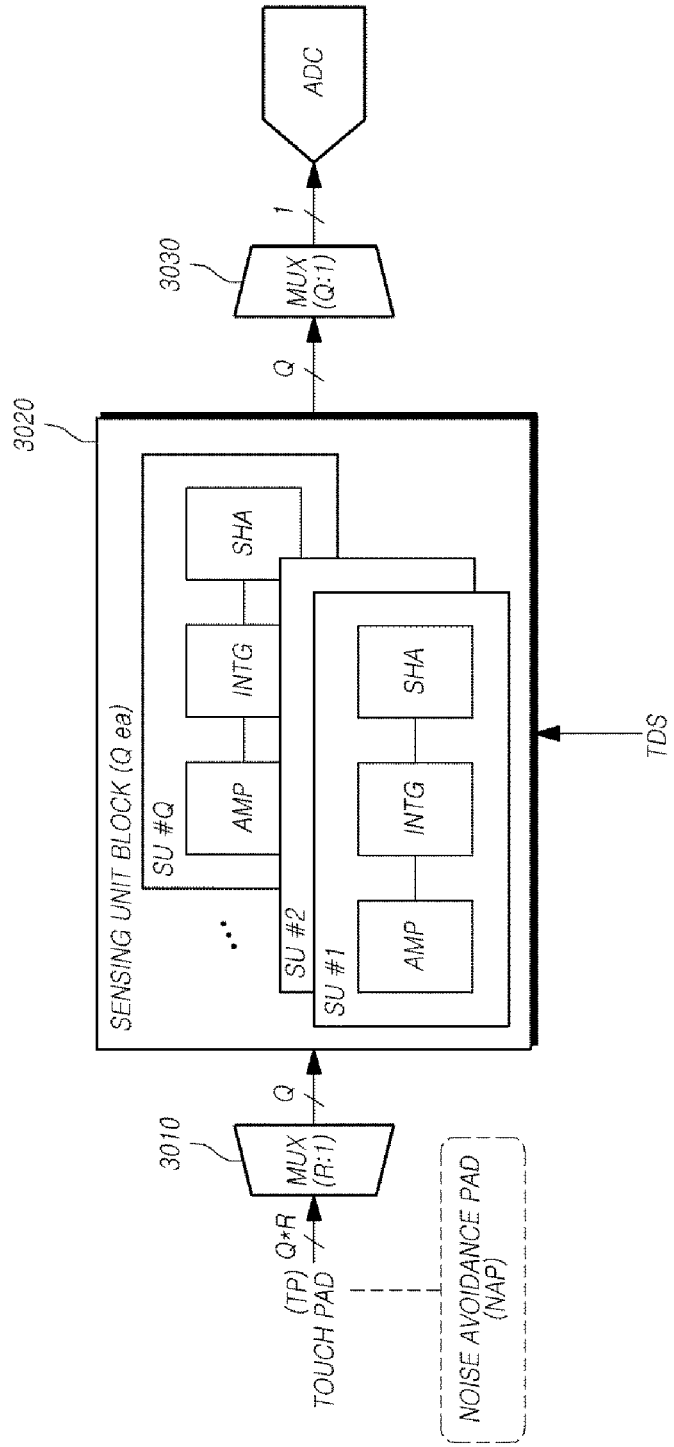
FIG. 30 and FIG. 31 are block diagrams illustrating inner configurations of touch driving circuits having noise-removing structures according to exemplary embodiments.
Figure 31:
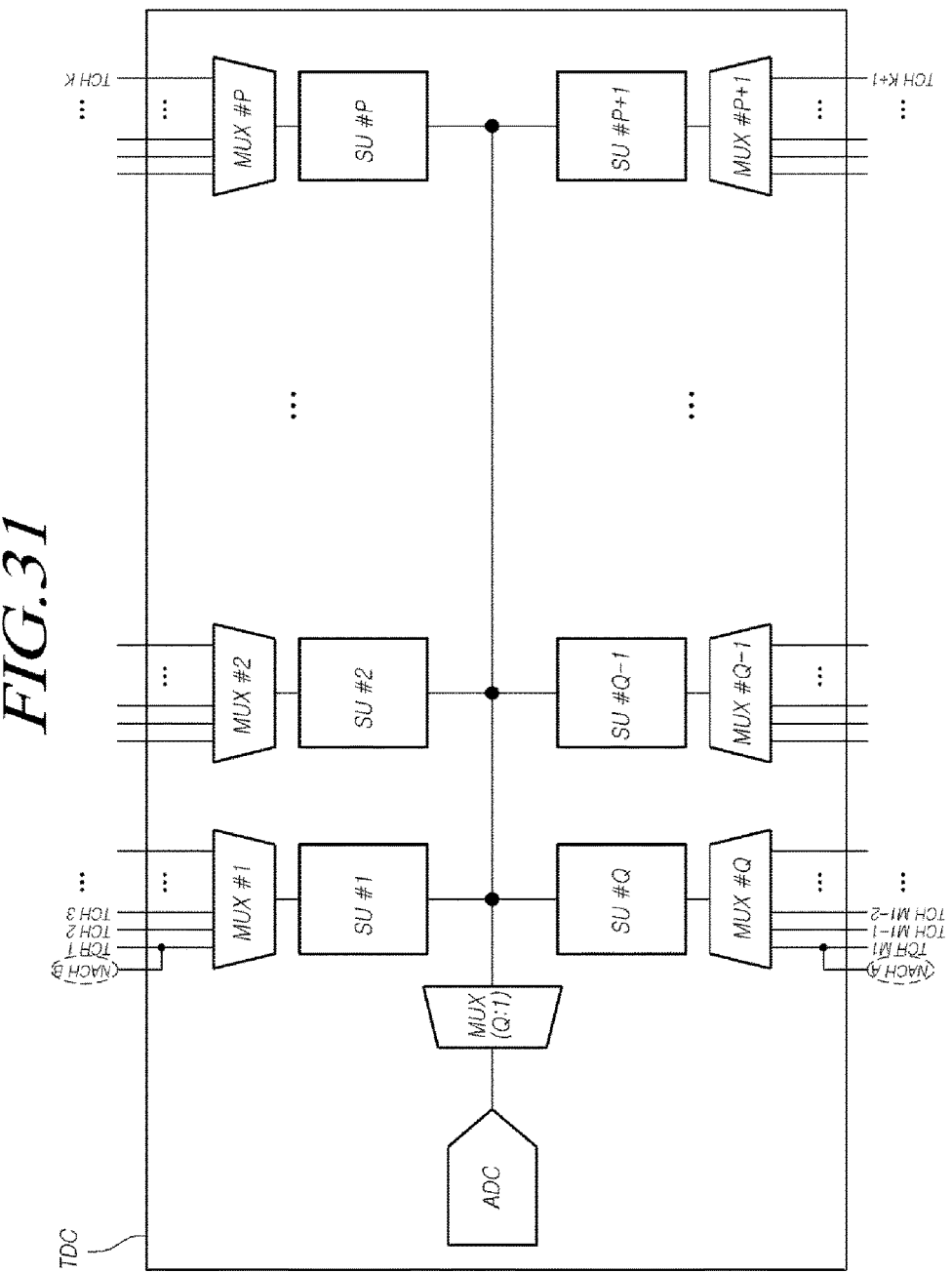

FIG. 30 and FIG. 31 are block diagrams illustrating the inner configurations of touch driving circuits TDCs having noise-removing structures according to exemplary embodiments.

Referring to FIG. 30, the touch driving circuit TDC includes Q*R (Q times R) touch pads TP (Q and R being integer numbers), a first multiplexer 3010, a sensing unit block 3020 including Q sensing units SU #1, SU #2, . . . , and SU #Q, a second multiplexer 3030, an analog-to-digital converter ADC, and so on.

Each of the Q sensing units SU #1 to SU #Q includes a pre-amplifier AMP, an integrator INTG, a sample-and-hold circuit SHA, and so on.

Although the sample-and-hold circuit SHA may be included in each of the Q sensing units SU #1 to SU #Q, a single sample-and-hold circuit SHA may be provided for every two or more sensing units or for the entirety of the Q sensing units SU #1 to SU #Q.

As described above with reference to FIG. 5, a touch driving signal TDS is output through the pre-amplifier AMP to be sent to a touch pad TP corresponding to a predetermined touch channel through the first multiplexer 3010.

The first multiplexer 3010 is an R:1 multiplexer selecting Q signals from signals (touch sensing signals) received from Q*R touch pads TP.

The selected Q signals are delivered to the Q sensing units SU #1 to SU #Q and are then input to the integrator INTG through the pre-amplifier AMP.

The integrator INTG outputs an integral value of a voltage output by the pre-amplifier AMP (i.e. a touch sensing signal output from the output terminal n3 of the pre-amplifier AMP). The integrator INTG may include devices, such as a comparator and a capacitor.

The signal output by the integrator INTG is input to the sample-and-hold circuit SHA.

The sample-and-hold circuit SHA is added to an input terminal of the analog-to-digital converter ADC. The sample-and-hold circuit SHA serves to sample an input voltage and maintain the sampled voltage. The voltage is maintained until the analog-to-digital converter ADC finishes a previous conversion process.

The second multiplexer 3030 is a Q:1 multiplexer. The second multiplexer 3030 selects one sensing unit among the Q sensing units SU #1 to SU #Q to input a voltage that has been maintained by the sample-and-hold circuit SHA of the selected sensing unit to the analog-to-digital converter ADC.

The analog-to-digital converter ADC converts the input voltage to a digital value and outputs a sensing value corresponding to the converted digital value.

The sensing value output as described above is used by the touch processor TP to determine the occurrence of a touch and a touched location.

The Q*R touch pads correspond to Q*R touch channels TCH.

According to the configuration illustrated in FIG. 24, the touch pad among the Q*R touch pads connected to the outermost touch channel line can be electrically connected to the noise avoidance pad NAP connected to the noise avoidance line NAL.

According to the configuration illustrated in FIG. 25, the touch pad among the Q*R touch pads connected to the outermost touch channel line can be electrically connected to the noise avoidance line NAL through the outermost touch channel line.

In FIG. 30, Q*R is a value corresponding to M1 in FIG. 23. Q and R are selective design values.

FIG. 31 illustrates an alternative embodiment of the touch driving circuit TDC, i.e. the touch driving circuit TDC of FIG. 23 mounted on the IC film ICF of FIG. 19.

Referring to FIG. 31, the touch driving circuit TDC includes Q multiplexers MUX #1, MUX #2, . . . , and MUX #Q, Q sensing units SU #1 to SU #Q corresponding to the Q multiplexers MUX #1 to MUX #Q, a multiplexer MUX T commonly connected to the Q sensing units SU #1 to SU #Q, an analog-to-digital converter ADC, and so on.

Each of the Q sensing units SU #1 to SU #Q illustrated in FIG. 31 may include a pre-amplifier AMP, an integrator INTG, a sample-and-hold circuit SHA, and so on, as illustrated in FIG. 30.

Each of the Q multiplexers MUX #1 to MUX #Q illustrated in FIG. 31 includes predetermined number of touch channels (corresponding to touch pads).

An outermost touch channel TCH 1 of the first multiplexer MUX #1 among the Q multiplexers MUX #1 to MUX #Q corresponds to an outermost touch channel line TCL_B on an IC film ICF.

The outermost touch channel TCH 1 of the first multiplexer MUX #1 can be electrically connected to a noise avoidance channel NACH_B located in an outer position using a pad connection structure as illustrated in FIG. 24, a line connection structure as illustrated in FIG. 25, or the like.

Here, the outermost touch channel TCH 1 of the first multiplexer MUX #1 is a touch channel corresponding to the outermost touch channel line TCL_B on the IC film ICF.

The noise avoidance channel NACH_B located outward of the outermost touch channel TCH 1 of the first multiplexer MUX #1 is a channel corresponding to a noise avoidance line NAL_B electrically connected to the outermost touch channel line TCL_B on the IC film ICF corresponding to the outermost touch channel TCH 1 of the first multiplexer MUX #1.

The noise avoidance line NAL_B can be electrically connected to the outermost touch channel line TCL_B on the IC film ICF using the pad connection structure as illustrated in FIG. 24, the line connection structure as illustrated in FIG. 25, or the like, the outermost touch channel line TCL_B corresponding to the outermost touch channel TCH 1 of the first multiplexer MUX #1.

An outermost touch channel TCH M1 of the Qth multiplexer MUX #Q among the Q multiplexers MUX #1 to MUX #Q corresponds to an outermost touch channel line TCL_A on the IC film ICF.

The outermost touch channel TCH M1 of the Qth multiplexer MUX #Q can be electrically connected to a noise avoidance channel NACH_A located in an outer position using the pad connection structure as illustrated in FIG. 24, the line connection structure as illustrated in FIG. 25, or the like.

The outermost touch channel TCH M1 of the Qth multiplexer MUX #Q is a touch channel corresponding to an outermost touch channel line TCL_A on the IC film ICF.

The noise avoidance channel NACH_A located outward of the outermost touch channel TCH M1 of the Qth multiplexer MUX #Q is a channel corresponding to a noise avoidance line NAL_A electrically connected to the outermost touch channel line TCL_A on the IC film ICF corresponding to the outermost touch channel TCH M1 of the Qth multiplexer MUX #Q.

The noise avoidance line NAL_A can be electrically connected to the outermost touch channel line TCL_A on the IC film ICF using the pad connection structure illustrated in FIG. 24, the line connection structure illustrated in FIG. 26, or the like, the outermost touch channel line TCL_A corresponding to the outermost touch channel TCH M1 of the Qth multiplexer MUX #Q.

According to the exemplary embodiments as set forth above, when a driving circuit is embodied as a COF type, there is an effect of providing a driving chip STIC able to remove or reduce noise that would otherwise cause touch sensing errors, a circuit film ICF, a COF type driving circuit IDC, and a display device 100 having a built-in touchscreen.

According to the exemplary embodiments as set forth above, there is an effect of providing an IC film ICF having a line structure able to prevent noise that would otherwise cause touch sensing errors, a driving chip STIC mounted thereon, a COF type driving circuit IDC, and a display device 100 having a built-in touchscreen.

The foregoing descriptions and the accompanying drawings have been presented in order to explain the certain principles of the present disclosure. A person skilled in the art to which the disclosure relates could make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended claims and all of their equivalents fall within the scope of the disclosure.

What is claimed is:

1. A display device, comprising:
   a touch enabled display panel having a plurality of touch electrodes, a plurality of signal lines, and a plurality of data lines; and
   an integrated driving circuit connected to the touch enabled display panel, the integrated driving circuit including:
   an integrated circuit film;
   a source driving circuit;
   a touch driving circuit;
   a plurality of output pads;
   a plurality of data channel lines each electrically connected to the source driving circuit;
   a plurality of touch channel lines each electrically connected to the touch driving circuit; and
   a plurality of conductive lines adjacent to the plurality of touch channel lines,
   wherein the plurality of data channel lines are electrically connected to the touch enabled display panel, and the plurality of touch channel lines are electrically connected to the touch enabled display panel,
   wherein at least one of the plurality of conductive lines is not electrically connected to the plurality of output pads,
   wherein the source driving circuit outputs image data voltages to the plurality of data channel lines to display an image on the touch enabled display panel,
   wherein the touch driving circuit outputs touch driving signals to the plurality of touch channel lines to sense a touch on the touch enabled display panel, and
   wherein the plurality of conductive lines are applied with a noise avoidance signal corresponding to the touch driving signals.

2. The display device of claim 1,
   wherein a first touch electrode of the plurality of touch electrodes is electrically connected to a first signal line of the plurality of signal lines and a second touch electrode of the plurality of touch electrodes is electrically connected to a second signal line of the plurality of signal lines,
   wherein the first signal line overlaps with the second touch electrode and the first signal line is not overlapped with the second signal line, and
   wherein the first signal line is electrically disconnected from the second signal line within the touch enabled display panel.

3. The display device of claim 1, wherein an amplitude of the noise avoidance signal is substantially identical to an amplitude of the touch driving signal, or the noise avoidance signal is in phase with the touch driving signal.

4. The display device of claim 1, wherein the touch driving circuit outputs a common voltage to the plurality of conductive lines according to a mode of the touch enabled display panel.

5. The display device of claim 1, wherein a touch sense signal is not being sensed from the plurality of conductive lines, and the plurality of conductive lines does not carry the image data voltages.

6. The display device of claim 1, wherein a mode of touch enabled display panel includes a display mode and a touch mode, and
   wherein the display mode and the touch mode are divided on a temporal basis, the display mode and the touch mode are simultaneous within a same period of time, or the display mode and the touch mode are overlapped with each other on a temporal basis.

7. The display device of claim 1, wherein the source driving circuit outputs load free driving signals to the plurality of data channel lines according to a mode of the touch enabled display panel, and the load free driving signals are substantially the same as the touch driving signals or are in phase with the touch driving signals.

8. The display device of claim 1, wherein the plurality of conductive lines comprise:
   a first conductive line; and
   a second conductive line located adjacent to the first conductive line,
   wherein a distance between the first conductive line and an outermost touch channel line of the plurality of touch channel lines is longer than a distance between the second conductive line and the outermost touch channel line of the plurality of touch channel lines.

9. The display device of claim 1, wherein the touch driving circuit includes two touch driving circuits, a first one of the two touch driving circuits is mounted on the integrated circuit film on a first side of the source driving circuit, and a second one of the two touch driving circuits is mounted on the integrated circuit film on a second side of the source driving circuit.

10. An integrated driving circuit electrically connected to a touch enabled display panel, the integrated driving circuit comprising:
  a source driving circuit;
  a touch driving circuit;
  a plurality of output pads;
  a plurality of data channel lines each electrically connected to the source driving circuit;
  a plurality of touch channel lines each electrically connected to the touch driving circuit; and
  a plurality of conductive lines adjacent to the plurality of touch channel lines,
  wherein the plurality of data channel lines are electrically connected to a plurality of data lines in the touch enabled display panel,
  wherein the source driving circuit outputs image data voltages to the plurality of data channel lines to display an image on the touch enabled display panel,
  wherein the plurality of touch channel lines are electrically connected to the plurality of output pads and at least one of the plurality of conductive lines is not electrically connected to the plurality of output pads,
  wherein the touch driving circuit outputs touch driving signals to the plurality of touch channel lines to sense a touch on the touch enabled display panel, and
  wherein the plurality of conductive lines are applied with a noise avoidance signal corresponding to the touch driving signals.

11. The integrated driving circuit of claim 10, wherein a first touch electrode of the plurality of touch electrodes in the touch enabled display panel is electrically connected to a first signal line of a plurality of signal lines in the touch enabled display panel and a second touch electrode of the plurality of touch electrodes is electrically connected to a second signal line of the plurality of signal lines,
  wherein the first signal line overlaps with the second touch electrode and the first signal line is not overlapped with the second signal line, and
  wherein the first signal line is electrically disconnected from the second signal line within the touch enabled display panel.

12. The integrated driving circuit of claim 10, wherein an amplitude of the noise avoidance signal is substantially identical to an amplitude of the touch driving signal, or the noise avoidance signal is in phase with the touch driving signal.

13. The integrated driving circuit of claim 10, wherein the touch driving circuit outputs a common voltage to the plurality of the conductive lines according to a mode of the touch enabled display panel.

14. The integrated driving circuit of claim 10, wherein a touch sense signal is not sensed from the plurality of conductive lines, and the plurality of conductive lines do not carry the image data voltages.

15. The integrated driving circuit of claim 10, wherein the mode of touch enabled display panel includes a display mode and a touch mode, and
  wherein the display mode and the touch mode are divided on a temporal basis, the display mode and the touch mode are simultaneous within a same period of time, or the display mode and the touch mode are overlapped with each other on a temporal basis.

16. The integrated driving circuit of claim 12, wherein the source driving circuit outputs load free driving signals to the plurality of data channel lines according to a mode of the touch enabled display panel, the load free driving signals are substantially the same as the touch driving signals or are in phase with the touch driving signals.

17. The integrated driving circuit of claim 12, wherein the plurality of conductive lines comprise:
  a first conductive line; and
  a second conductive line located adjacent to the first conductive line,
  wherein a distance between the first conductive line and an outermost touch channel line of the plurality of touch channel lines is longer than a distance between the second conductive line and the outermost touch channel line of the plurality of touch channel lines.

18. The integrated driving circuit of claim 12, wherein the plurality of conductive lines comprise:
  a first conductive line located adjacent to a first outermost touch channel line; and
  a second conductive line located adjacent to a second outermost touch channel line different from the first outermost touch channel line,
  wherein a length of the first outermost touch channel line is different from a length of the second outermost touch channel line.

19. The integrated driving circuit of claim 12, wherein the source driving circuit and the touch driving circuit are mounted on an integrated circuit film, and the plurality of data channel lines, the plurality of touch channel lines, and the plurality of conductive lines are disposed on the integrated circuit film.

20. The integrated driving circuit of claim 19, wherein the touch driving circuit includes two touch driving circuits, a first one of the two touch driving circuits is mounted on the integrated circuit film on a first side of the source driving circuit, and a second one of the two touch driving circuits is mounted on the integrated circuit film on a second side of the source driving circuit.

* * * * *